US011378385B2

(12) United States Patent
Beckwith et al.

(10) Patent No.: US 11,378,385 B2
(45) Date of Patent: Jul. 5, 2022

(54) DUAL LASER DISTANCE MEASURER WITH MIDPOINT LOCATING FEATURE

(71) Applicant: OLYMPIA TOOLS INTERNATIONAL, INC., Covina, CA (US)

(72) Inventors: Jonathan S. Beckwith, Durham, NC (US); Roger Dale Hurley, Jr., Raleigh, NC (US); Jimmy Shangyao Wei, Morrisville, NC (US)

(73) Assignee: Olympia Tools International Inc., Covina, CA (US)

(*) Notice: Subject to any disclaimer, the term of this patent is extended or adjusted under 35 U.S.C. 154(b) by 152 days.

(21) Appl. No.: 16/945,017

(22) Filed: Jul. 31, 2020

(65) Prior Publication Data

US 2022/0034647 A1 Feb. 3, 2022

(51) Int. Cl.
*G01B 11/02* (2006.01)
*G01S 17/08* (2006.01)

(52) U.S. Cl.
CPC .......... *G01B 11/026* (2013.01); *G01S 17/08* (2013.01)

(58) Field of Classification Search
CPC .............................. G01B 11/026; G01S 17/08
See application file for complete search history.

(56) References Cited

U.S. PATENT DOCUMENTS

| 9,726,760 | B2 | 8/2017 | Lai | |
|---|---|---|---|---|
| 2007/0071430 | A1* | 3/2007 | Iwanaga | G01C 3/10 396/114 |
| 2014/0071425 | A1* | 3/2014 | Dunne | G01S 17/36 356/4.01 |
| 2020/0013177 | A1* | 1/2020 | Panosian | H04N 5/23216 |

OTHER PUBLICATIONS

Lai; Automatic Electronic Rangefinder; U.S. Appl. No. 16/591,597, filed Oct. 2, 2019.
LazerTape Bi-Directional Distance Measurer LSR2018, https://www.engineersupply.com/lazertape-bi-directional-distance-measurer-LSR2018.aspx?VariantId=b4269645-0fb8-479c-991a-719165ca3f23, accessed Jul. 31, 2020.

* cited by examiner

*Primary Examiner* — Jonathan M Hansen
(74) *Attorney, Agent, or Firm* — Patterson + Sheridan, LLP

(57) ABSTRACT

An apparatus and method for locating a midpoint between surfaces is disclosed herein. A laser distance measurer includes a housing having a top surface, a bottom surface, and first and second side surfaces intersecting the top and bottom surfaces, a first laser and a first sensor disposed along the first side surface, and a second laser and a second sensor disposed along the second side surface. The laser distance measurer includes a processor disposed in the housing configured to determine a first distance from the laser distance measurer to the first surface, determine a second distance from the laser distance measurer to the second surface, and indicate a position of the laser distance measurer relative to the midpoint between the first and second surfaces based on the first and second distances.

27 Claims, 14 Drawing Sheets

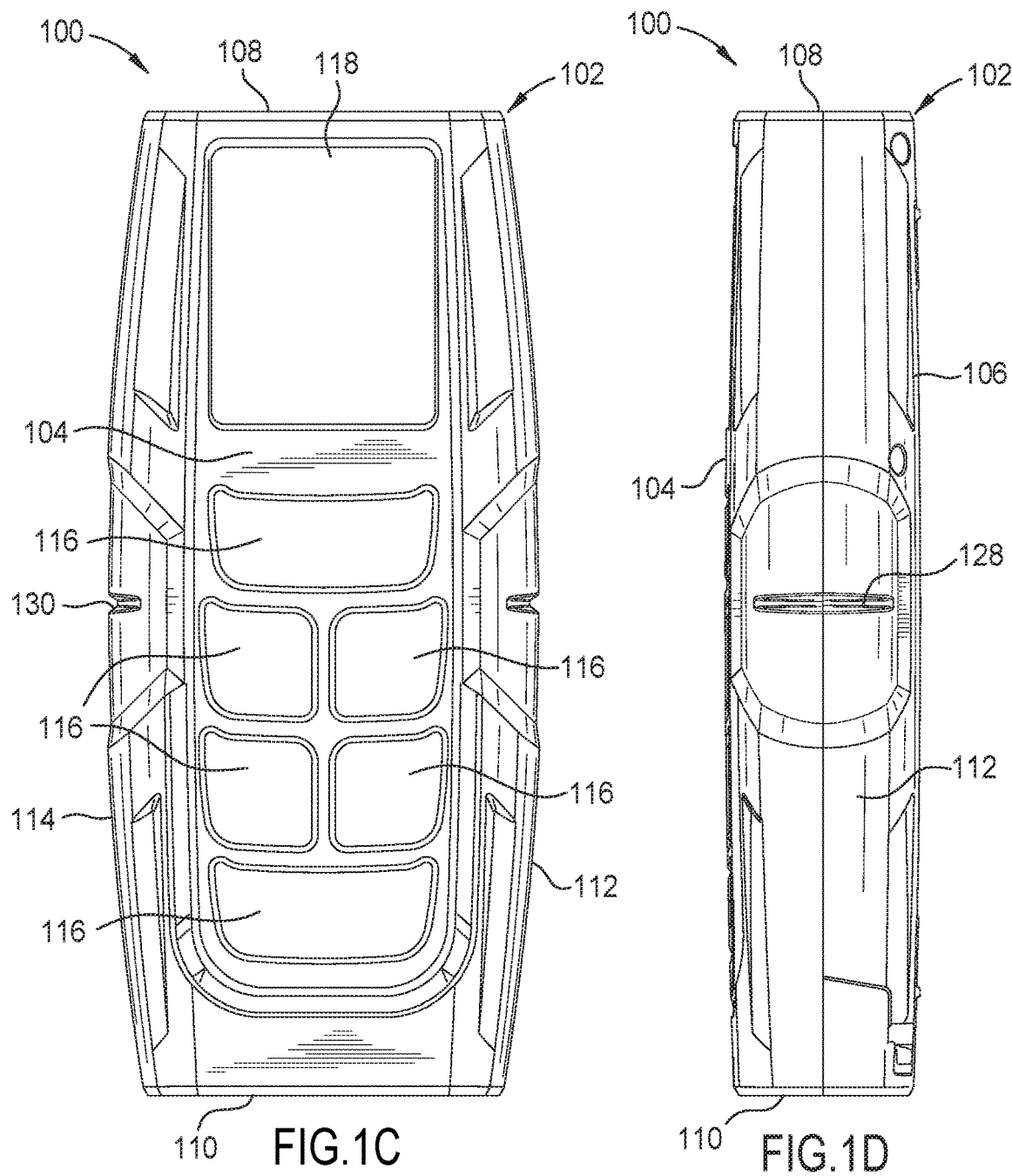
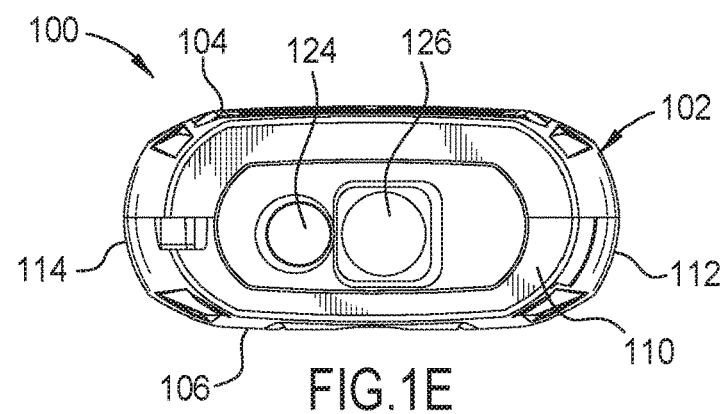

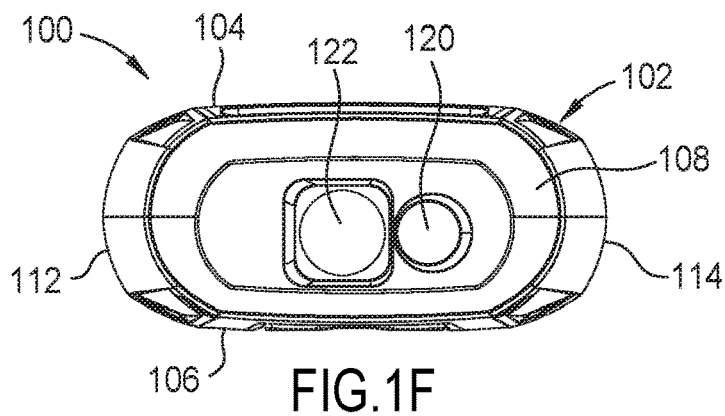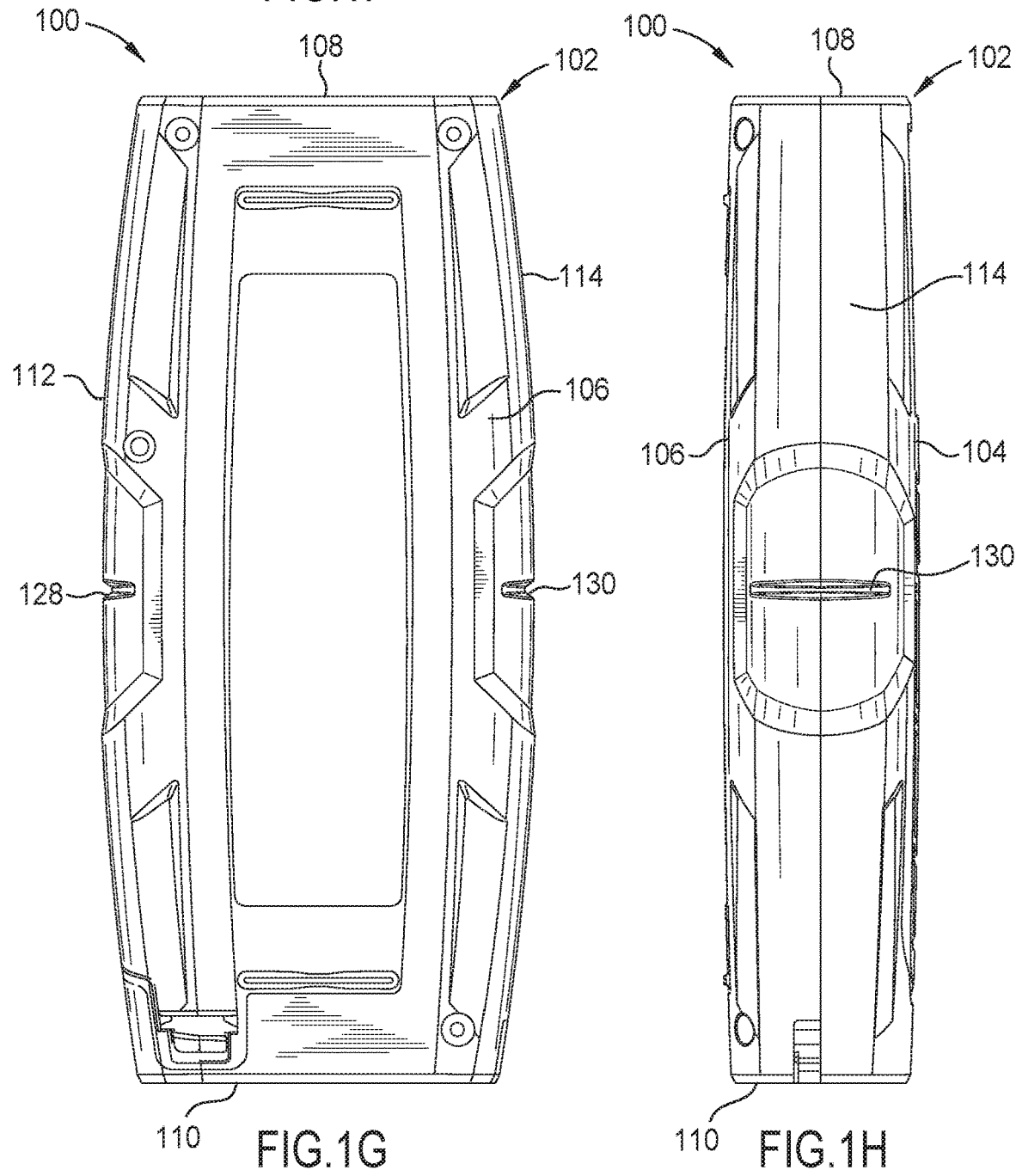

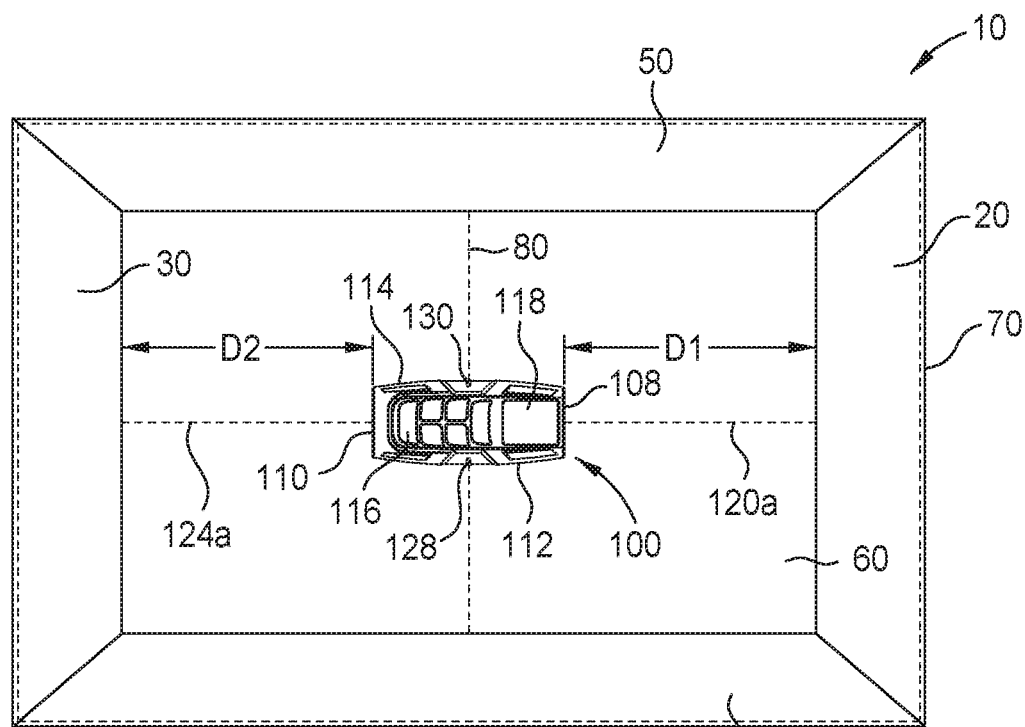
FIG.2A
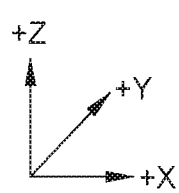
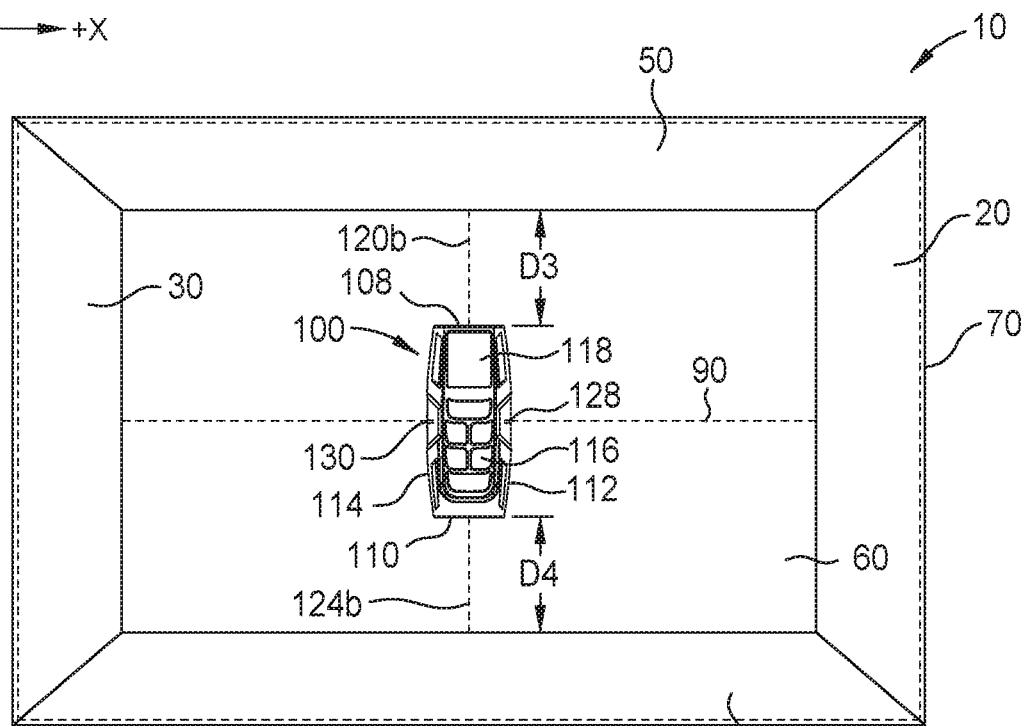
FIG.2B

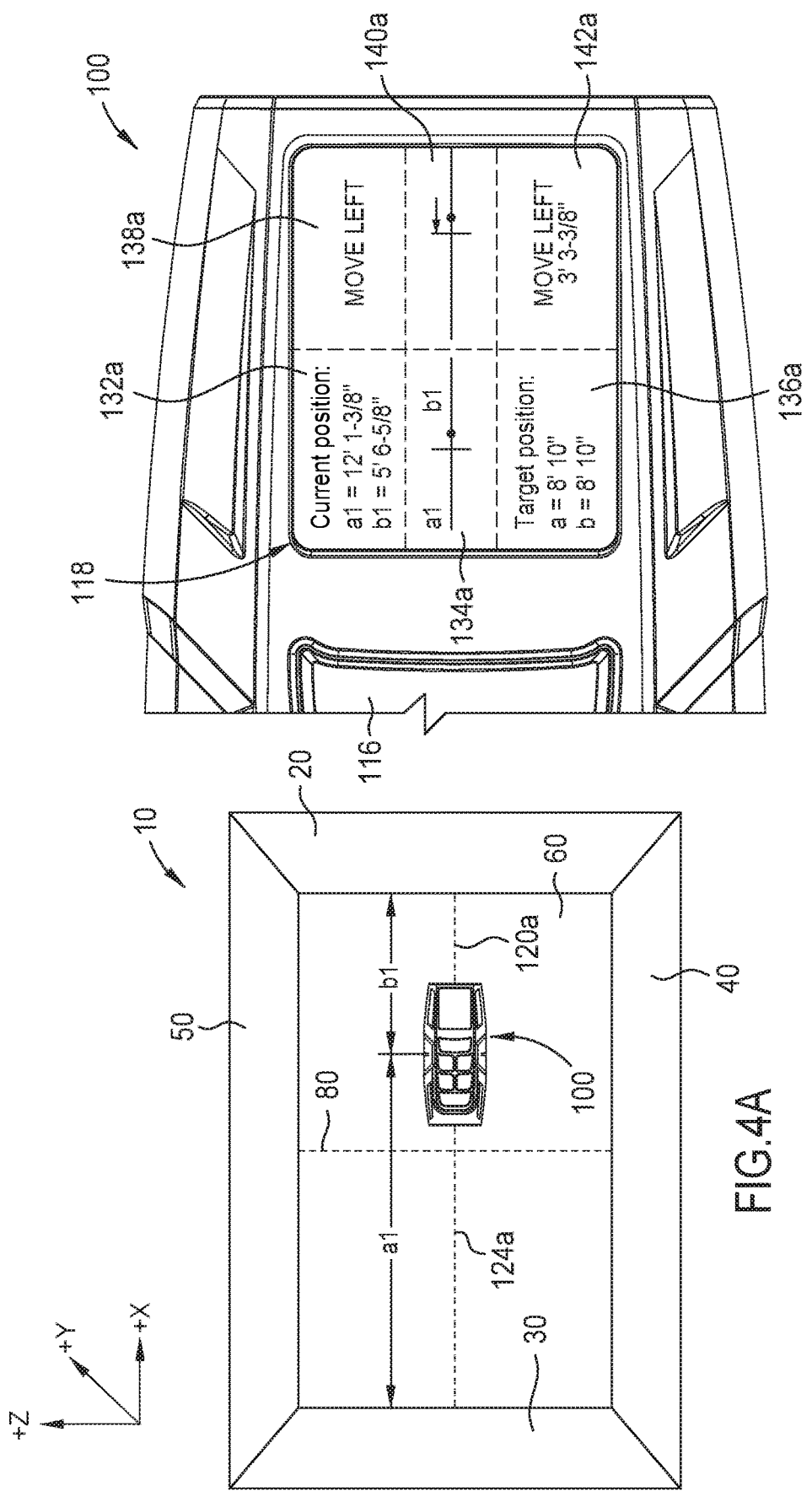

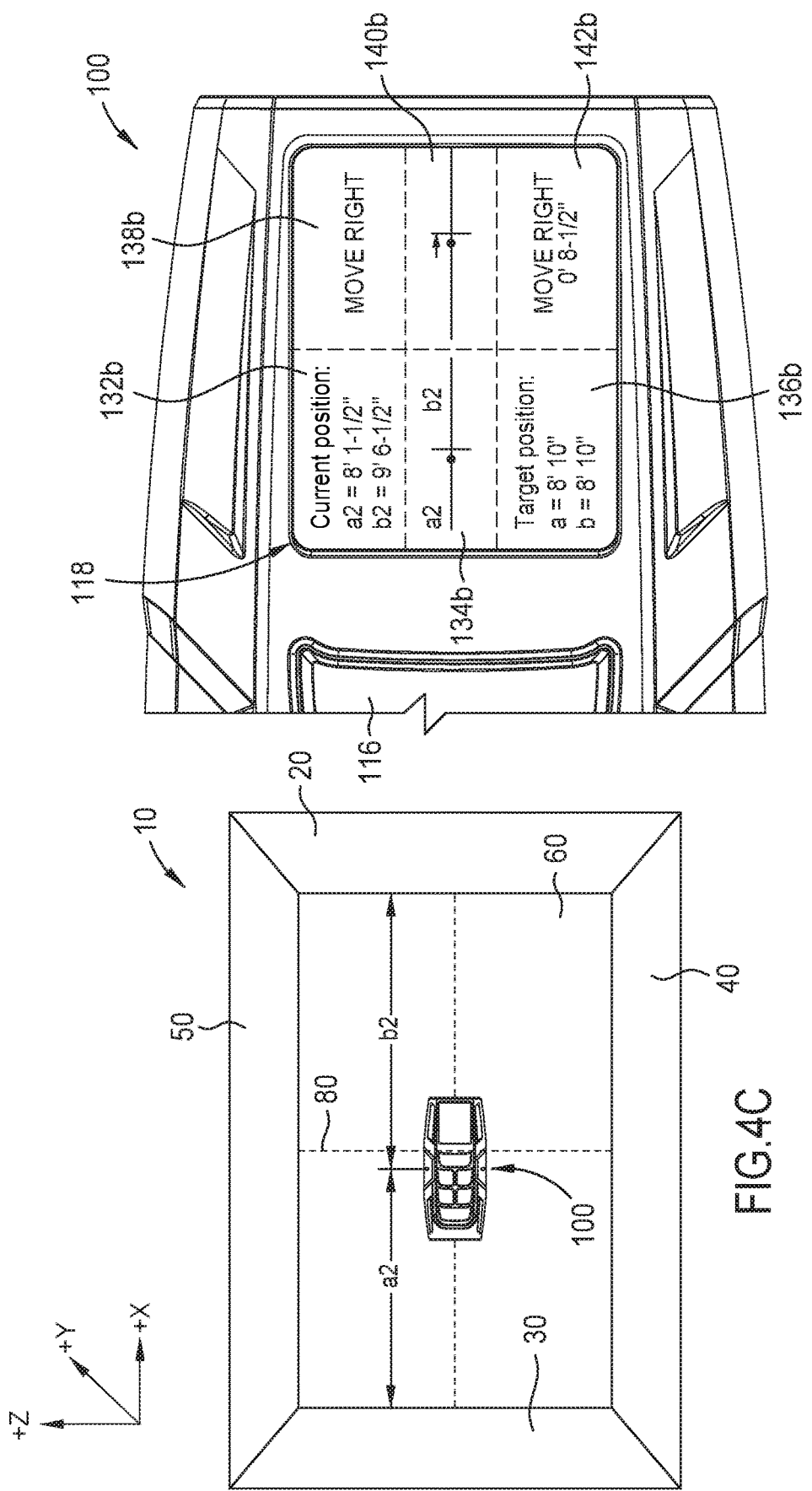

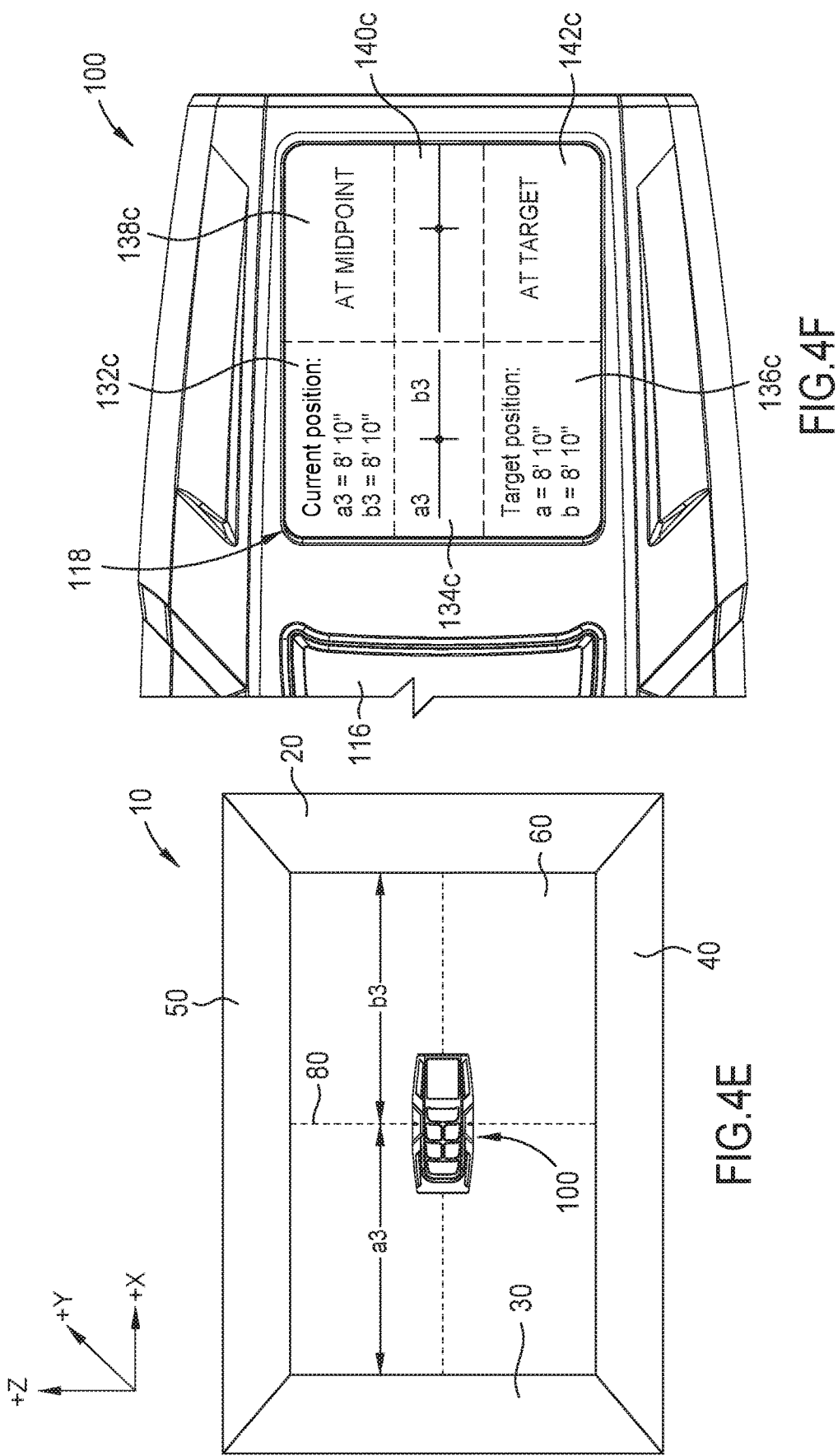

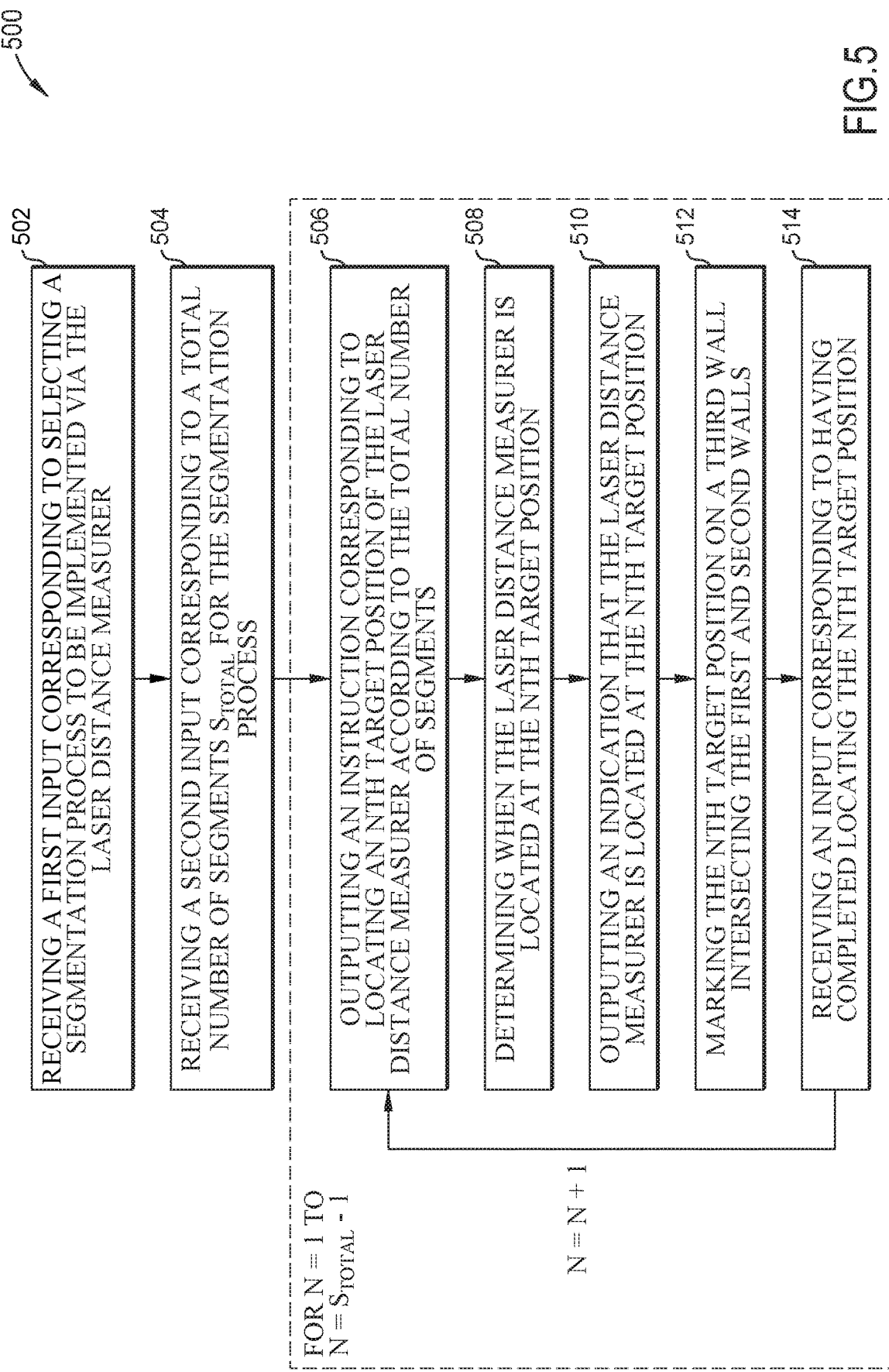

DUAL LASER DISTANCE MEASURER WITH MIDPOINT LOCATING FEATURE

BACKGROUND

Embodiments described herein generally relate to a dual laser distance measurer with midpoint locating feature. Some conventional laser distance measurers only measure distance in one direction. Other conventional laser distance measurers only determine total distance between two walls. In addition, conventional laser distance measurers only operate in a non-continuous mode. Embodiments of this disclosure overcome at least some of these issues.

SUMMARY

The present disclosure generally describes a laser distance measurer for locating a midpoint between a first surface and a second surface opposite the first surface. The laser distance measurer generally includes a housing, first and second lasers, first and second sensors, and a processor. The housing includes a top surface, a bottom surface, and first and second side surfaces intersecting the top and bottom surfaces. The first laser is disposed along the first side surface for emitting a first laser beam in a first direction. The first sensor is disposed along the first side surface for receiving laser light reflected from the first surface. The second laser is disposed along the second side surface for emitting a second laser beam in a second direction opposite the first direction. The second sensor is disposed along the second side surface for receiving laser light reflected from the second surface. The processor is disposed in the housing and configured to determine a first distance from the laser distance measurer to the first surface and a second distance from the laser distance measurer to the second surface. The processor is further configured to indicate a position of the laser distance measurer relative to the midpoint between the first and second surfaces based on the first and second distances.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

FIG. 1C is a plan view of the laser distance measurer of FIG. 1A.

FIG. 1D is a right side view of the laser distance measurer of FIG. 1A.

FIG. 1E is a bottom end view of the laser distance measurer of FIG. 1A.

FIG. 1F is a top end view of the laser distance measurer of FIG. 1A.

FIG. 1G is a bottom view of the laser distance measurer of FIG. 1A.

FIG. 1H is a left side view of the laser distance measurer of FIG. 1A.

FIG. 2A is a perspective view of a laser distance measurer in a building enclosure illustrating wall to wall measurement, in accordance with some embodiments.

FIG. 2B is a perspective view of a laser distance measurer in a building enclosure illustrating floor to ceiling measurement, in accordance with some embodiments.

FIG. 4A is a perspective view of a laser distance measurer in a building enclosure illustrating a starting position for implementing the method of FIG. 3.

FIG. 4B is an enlarged view of the laser distance measurer of FIG. 4A illustrating an exemplary screen content displayed by the laser distance measurer.

FIG. 4C is a perspective view of a laser distance measurer in a second position after moving the laser distance measurer relative to the starting position of FIG. 4A.

FIG. 4D is an enlarged view of the laser distance measurer of FIG. 4C illustrating an updated screen content displayed by the laser distance measurer.

FIG. 4E is a perspective view of a laser distance measurer in a third position after moving the laser distance measurer relative to the second position of FIG. 4C.

FIG. 4F is an enlarged view of the laser distance measurer of FIG. 4E illustrating an updated screen content displayed by the laser distance measurer.

FIG. 5 is a flow chart illustrating a method for performing a segmentation process using a laser distance measurer, in accordance with some embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1A:
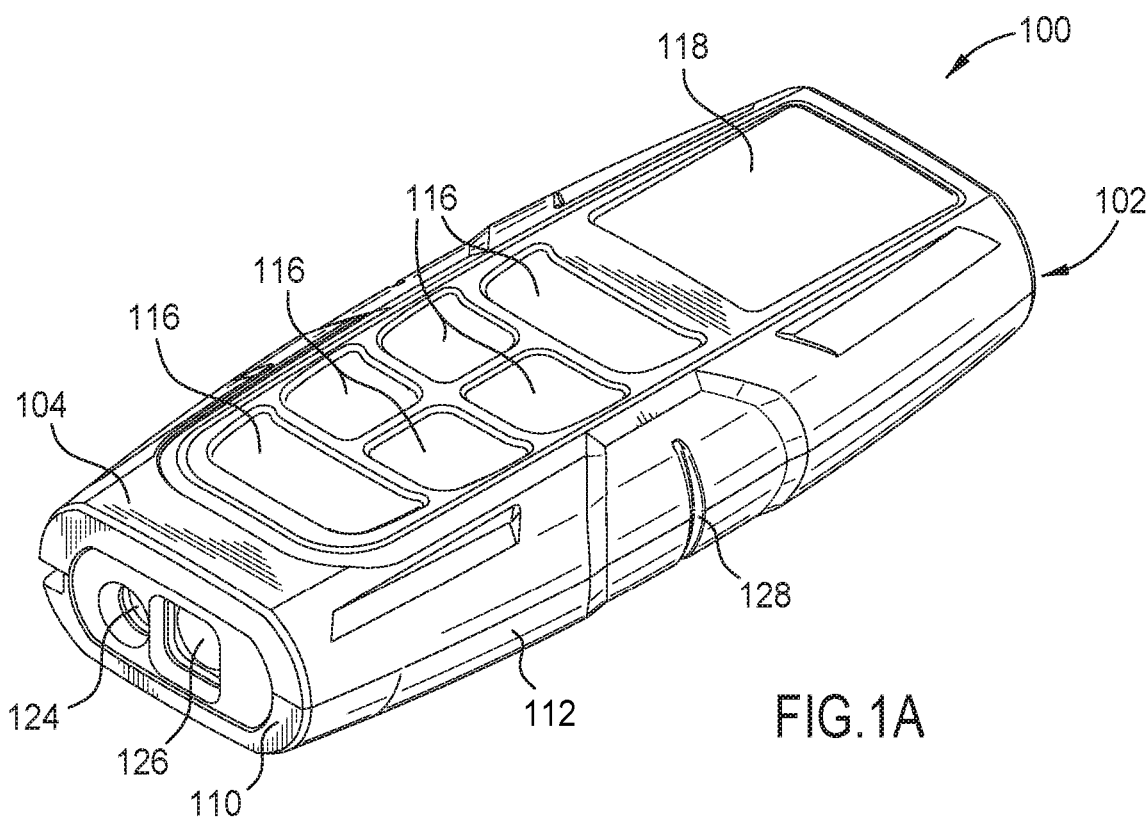
FIG. 1A is a perspective view of a laser distance measurer in accordance with some embodiments.

Embodiments of the present disclosure relate to a laser distance measurer for locating a midpoint between a first surface and a second surface opposite the first surface. The laser distance measurer includes a housing having a top surface, a bottom surface, and first and second side surfaces intersecting the top and bottom surfaces. The laser distance measurer includes a first laser disposed along the first side surface for emitting a first laser beam in a first direction and a first sensor disposed along the first side surface for receiving laser light reflected from the first surface. The laser distance measurer includes a second laser disposed along the second side surface for emitting a second laser beam in a second direction opposite the first direction and a second sensor disposed along the second side surface for receiving laser light reflected from the second surface. The laser distance measurer includes a processor disposed in the housing. The processor is configured to determine a first distance from the laser distance measurer to the first surface and a second distance from the laser distance measurer to the second surface and to indicate a position of the laser distance measurer relative to the midpoint between the first and second surfaces based on the first and second distances.

Embodiments of the present disclosure also include a method for locating a midpoint between a first surface and a second surface. The method includes directing a first laser beam toward the first surface and a second laser beam toward the second surface, where the first and second laser beams are emitted in opposite directions from a laser distance measurer. The method includes independently receiving, at the laser distance measurer, laser light reflected from the first and second surfaces. The method includes determining a first distance from the laser distance measurer to the first surface and a second distance from the laser distance measurer to the second surface. The method includes indicating a position of the laser distance measurer relative to the midpoint between the first and second surfaces based on the first and second distances.

Embodiments of the present disclosure also include a method for performing a segmentation process. The method includes determining one or more target positions between a first surface and a second surface. The method includes directing a first laser beam toward the first surface and a second laser beam toward the second surface, where the first and second laser beams are emitted in opposite directions from a laser distance measurer. The method includes independently receiving, at the laser distance measurer, laser light reflected from the first and second surfaces. The method includes determining a first distance from the laser distance measurer to the first surface and a second distance from the laser distance measurer to the second surface. The method includes indicating a position of the laser distance measurer relative to a first target position based on the first and second distances.

Figure 1B:
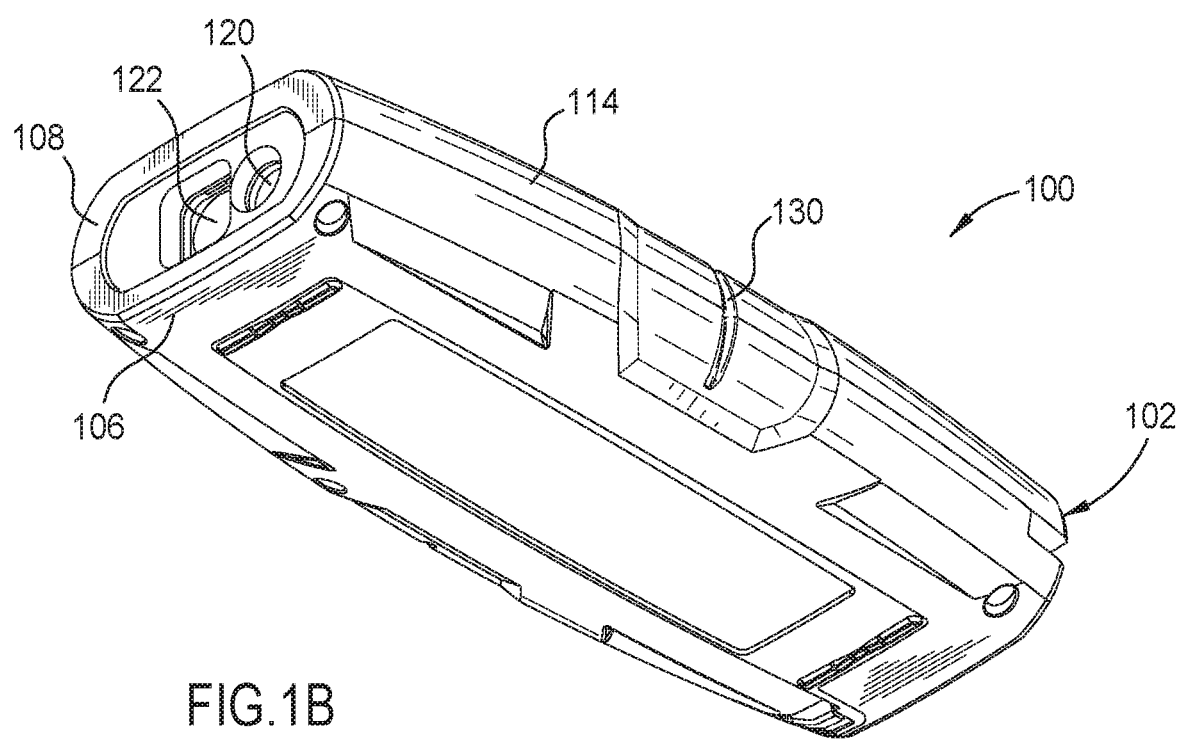
FIG. 1B is a reversed perspective view of the laser distance measurer of FIG. 1A.

FIG. 1A is a perspective view of a laser distance measurer 100 in accordance with some embodiments. FIG. 1B is a reversed perspective view of the laser distance measurer 100 of FIG. 1A. FIGS. 1C-1H are plan, right side, bottom end, top end, bottom, and left side views, respectively, of the laser distance measurer 100 of FIG. 1A.

Referring to FIGS. 1A-1H, the laser distance measurer 100 includes a housing 102 having a top surface 104, a bottom surface 106, and first and second side surfaces 108, 110 intersecting the top and bottom surfaces 104, 106. In some embodiments, the first side surface 108 may be a top end of the housing 102, and the second side surface 110 may be a bottom end of the housing 102. The first and second side surfaces 108, 110 are along a short end, or width, of the housing 102 (i.e., the first and second side surfaces 108, 110 run widthwise).

The housing 102 also includes third and fourth side surfaces 112, 114 intersecting the top and bottom surfaces 104, 106 and the first and second side surfaces 108, 110. In some embodiments, the third side surface 112 may be a right side of the housing 102, and the fourth side surface 114 may be a left side of the housing 102. The third and fourth side surfaces 112, 114 are along a long end, or length, of the housing 102 (i.e., the third and fourth side surfaces 112, 114 run lengthwise). Alternatively, the first and second side surfaces 108, 110 may be switched with the third and fourth side surfaces 112, 114 such that the first and second side surfaces 108, 110 run lengthwise and the third and fourth side surfaces 112, 114 run widthwise.

As illustrated, the housing 102 is generally rectangular-shaped being wider toward the center of the third and fourth side surfaces 112, 114 than at each end of the third and fourth side surfaces 112, 114. However, the shape of the housing 102 is not particularly limited to the illustrated embodiment. For example, the shape of the housing 102 may generally be polygonal. In some embodiments, the housing 102 may have an oblong shape, such as being generally rectangular, obround, or elliptical. Alternatively, the housing 102 may be generally square-shaped. In some embodiments, the housing 102 may have any suitable shape, number of sides, and orientation of sides. In some embodiments, the housing 102 may be integrally constructed or assembled from separate parts. In some embodiments, the housing 102 may be formed of plastics, metals, polymers, rubbers, other suitable materials, or combinations thereof.

The housing 102 includes one or more input keys 116 disposed on the top surface 104. In some embodiments, the input keys 116 are physical buttons having any suitable size and shape. Alternatively, the input keys 116 may be part of a capacitive touchscreen interface. The housing 102 includes a display 118 disposed on the top surface 104 for displaying a screen content. In some embodiments, the display 118 may be a dot matrix display. In some other embodiments, the display 118 may be a digital display screen, such as an LCD display. In yet other embodiments, the display 118 may be a capacitive touchscreen interface. In some embodiments, the input keys 116 and the display 118 can be implemented as an integrated touchscreen.

Figure 1I:
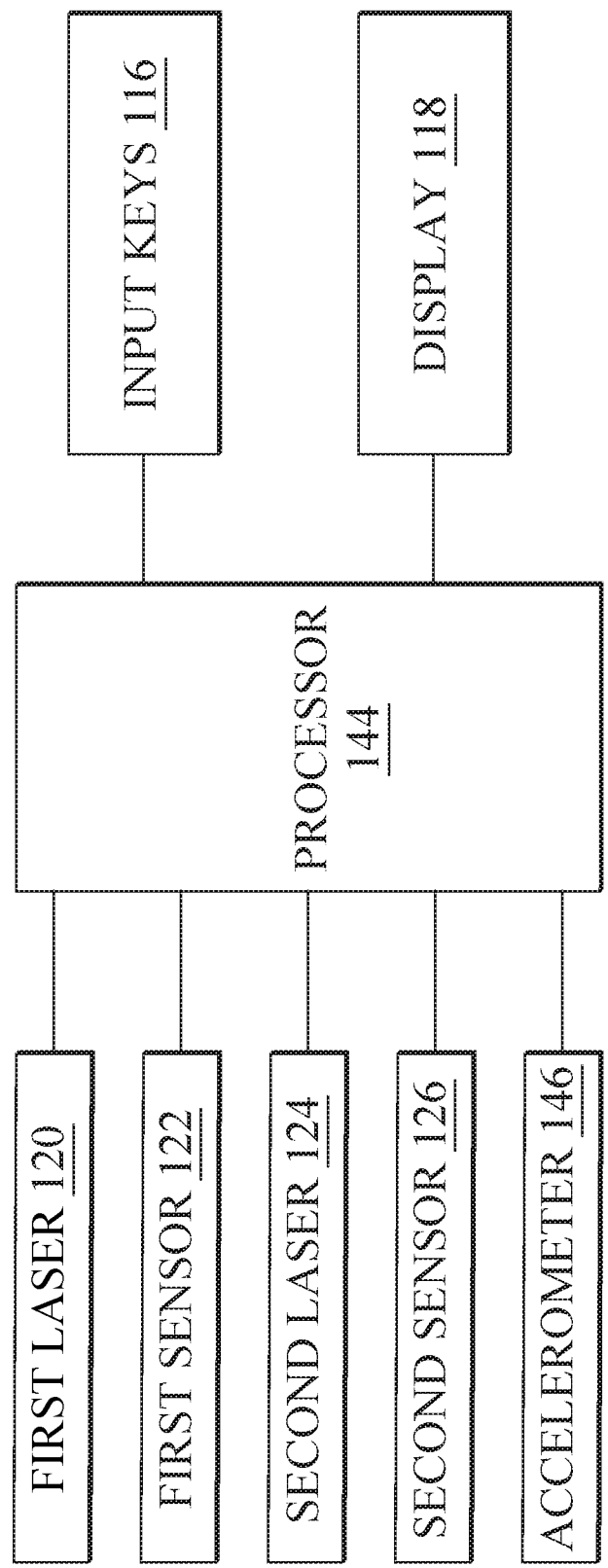
FIG. 1I is a block diagram illustrating hardware of a laser distance measurer, in accordance with some embodiments.

FIG. 1I is a block diagram illustrating hardware of a laser distance measurer 100, in accordance with some embodiments. Referring to FIGS. 1A-1I, the laser distance measurer 100 includes a first laser 120 disposed along the first side surface 108 of the housing 102 for emitting a first laser beam in a first direction. The laser distance measurer 100 also includes a first sensor 122 disposed along the first side surface 108 of the housing 102 for receiving laser light reflected from a first surface. The first laser 120 and first sensor 122 are oriented parallel to a longitudinal axis of the housing 102. The first laser 102 and first sensor 122 are disposed adjacent to each other.

The laser distance measurer 100 includes a second laser 124 disposed along the second side surface 110 of the housing 102 for emitting a second laser beam in a second direction opposite the first direction. In some embodiments, the first and second lasers 120, 124 may be laser transmitter diodes or other suitable laser sources. In some embodiments, the laser light emitted by the first and second lasers 120, 124 may have a wavelength in one of the visible spectrum or the infrared spectrum. The laser distance measurer 100 also includes a second sensor 126 disposed along the second side surface 110 of the housing 102 for receiving laser light reflected from a second surface opposite the first surface. The second laser 124 and second sensor 126 are oriented parallel to a longitudinal axis of the housing 102. The second laser 124 and second sensor 126 are disposed adjacent to each other. In some embodiments, the first and second sensors 122, 126 may be laser receiver diodes or other suitable laser detectors.

In some embodiments, each of the first laser 120 and first sensor 122 and the second laser 124 and second sensor 126 may be separate components. In some other embodiments, the transmitting and receiving diodes may be combined into a single component part. For example, the first laser 120 and first sensor 122 may be a combined first laser module, and the second laser 124 and second sensor 126 may be a combined second laser module. In some embodiments, each of the first laser 120 and first sensor 122 and the second laser 124 and second sensor 126 may be laser distance sensors selected from diffuse, background suppression, retroreflective, time-of-flight, or other suitable sensors.

Referring to FIG. 1I, the laser distance measurer 100 includes a processor 144 disposed in the housing 102. In some embodiments, the processor 144 may be a microprocessor, a microcontroller, an embedded processor, a digital signal processor, a CPU, a PLC, or another suitable processor. The processor 144 is connected to the one or more input keys 116 for receiving input commands. The processor 144 is connected to the display 118 for transmitting screen content to the display 118. The processor 144 is connected to the first laser 120, first sensor 122, second laser 124, and second sensor 126 for transmitting and receiving instructions, signals, and other data to and from each component. In some embodiments, the laser distance measurer 100 may also include a speaker, a rechargeable battery, a storage device, a wireless transceiver, a GPS module, and/or other electronic components.

The laser distance measurer 100 includes a spatial orientation device 146 for determining a spatial orientation state of the laser distance measurer 100. The spatial orientation device 146 may be, for example, an accelerometer and/or a gyroscope. According to an embodiment, the spatial orientation device 146 may be, for example, three-axis gyroscope. The spatial orientation device 146 is connected to the processor 144 for transmitting the spatial orientation state to the processor 144. For example, the spatial orientation device 146 can determine an orientation angle (or skew) of the laser distance measurer 100 relative to one or more of the x-axis, y-axis, or z-axis.

The housing 102 includes a first notch 128 formed in the third side surface 112. The first notch 128 corresponds to a midpoint of the housing 102 between the first and second side surfaces 108, 110. In other words, the first notch 128 corresponds to the midpoint of the housing 102 in a longitudinal or lengthwise direction. The housing 102 also includes a second notch 130 formed in the fourth side surface 114. The second notch 130 is aligned with the first notch 128 such that the second notch 130 also corresponds to the midpoint of the housing 102 between the first and second side surfaces 108, 110.

In some other embodiments, the laser distance measurer 100 may include a visible light source (not shown) disposed in one or more of the third and fourth side surfaces 112, 114 or along the bottom surface 106 of the housing for projecting a point and/or line of light corresponding to the midpoint of the housing 102 between the first and second side surfaces 108, 110.

FIG. 2A is a perspective view of a laser distance measurer 100 in a building enclosure 10 illustrating wall to wall measurement, in accordance with some embodiments. Referring to FIG. 2A, the building enclosure 10 includes a first wall 20 and an opposing second wall 30. The first and second walls 20, 30 are oriented substantially vertically in the y-z plane such that the first and second walls 20, 30 are substantially parallel to each other. Alternatively, the first and second walls 20, 30 may be non-parallel. The building enclosure 10 includes a floor 40 and an opposing ceiling 50. The floor 40 and ceiling 50 intersect the first and second walls 20, 30. The floor 40 and ceiling 50 are oriented substantially horizontally in the x-y plane such that the floor 40 and ceiling 50 are oriented substantially parallel to each other and substantially perpendicular to the first and second walls 20, 30. Alternatively, the floor 40 and ceiling 50 may be non-parallel to each other. Alternatively, the floor 40 and ceiling 50 may intersect the first and second walls 20, 30 at a non-perpendicular angle, such as between 0 degrees and 90 degrees, alternatively between 90 degrees and 180 degrees.

The building enclosure 10 includes a third wall 60 intersecting both the first and second walls 20, 30 and the floor 40 and ceiling 50. The third wall 60 is oriented substantially vertically in the x-z plane such that the third wall 60 is oriented substantially perpendicular to the first and second walls 20, 30 and the floor 40 and ceiling 50. Alternatively, the third wall 60 may be oriented at a non-perpendicular angle to the first and second walls 20, 30 and the floor 40 and ceiling 50. The building enclosure 10 may also include a fourth wall 70 (shown in phantom) opposite the third wall 60. The fourth wall 70 may be substantially parallel to the third wall 60. Alternatively the third wall 60 and the fourth wall 70 may be non-parallel.

The laser distance measurer 100 can be used for wall to wall measurement in the building enclosure 10 to determine a first midpoint 80 (i.e., along a vertical center line) of the third wall 60 where the first midpoint 80 of the third wall 60 is halfway between the first and second walls 20, 30. The bottom surface 106 of the laser distance measurer 100 may contact the third wall 60. Alternatively, the laser distance measurer 100 may be operated without contacting the third wall 60. For example, a spacing between the laser distance measurer 100 and the third wall 60 may be from about 0 inches to about 12 inches, such as from about 0 inches to about 6 inches, such as from about 0 inches to about 3 inches, such as from about 0 inches to about 1 inch.

In some embodiments, the laser distance measurer 100 emits a first laser beam 120*a* from the first side surface 108 in a +x direction and a second laser beam 124*a* from the second side surface 110 in a −x direction. When the first and second laser beams 120*a*, 124*a* impact the first and second walls 20, 30, respectively, laser light is reflected toward the laser distance measurer 100 and received by the first and second sensors 122, 126 (FIGS. 1A-1H), respectively.

In some embodiments, the first and second laser beams 120*a*, 124*a* may include short pulses of light having specific wavelength and frequency, and the first and second sensors 122, 126 may detect the reflected pulsed laser light from the first and second walls 20, 30, respectively. In some embodiments, the laser distance measurer 100 may use a time-of-flight method to determine distance. For example, a distance D1 between the first side surface 108 and the first wall 20 may be determined based on total transit time for light from the first laser beam 120*a* to travel from the first laser 120 to the first wall 20 and for reflected light to return to the first sensor 122. Likewise, a distance D2 between the second side surface 110 and the second wall 30 may be determined based on total transit time for light from the second laser beam 124*a* to travel from the second laser 124 to the second wall 30 and for reflected light to return to the second sensor 126.

In some other embodiments, the laser distance measurer 100 may use a phase shift method to determine distance. For example, the first laser 120 and first sensor 122 may include an internal reference path (not shown). Each pulse of light may include an external portion along an external measurement path (i.e., the first laser beam 120*a* traveling from the first laser 120 to the first wall 20 and light reflected from the first wall 20 returning to the first sensor 122) and an internal portion (not shown) along the internal reference path. Runtime differences between the internal reference path and the external measurement path result in a phase shift of each pulse of light which is proportional to the distance D1. Thus, measurement of the phase shift can be used to determine the distance D1. Likewise, the second laser 124 and second sensor 126 may also include an internal reference path (not shown). Each pulse of light may include an external portion along an external measurement path (i.e., the second laser beam 124a traveling from the second laser 124 to the second wall 30 and light reflected from the second wall 30 returning to the second sensor 126) and an internal portion (not shown) along the internal reference path. Runtime differences between the internal reference path and the external measurement path result in a phase shift of each pulse of light which is proportional to the distance D2. Thus, measurement of the phase shift can be used to determine the distance D2. In one or more embodiments, signals corresponding to time and/or wavelength of reflected laser light detected by the first and second sensors 122, 126 may be transmitted to the processor 144 for determining the distances D1, D2 in real-time.

As illustrated in FIG. 2A, the first notch 128 formed in the third side surface 112 corresponds to the first midpoint 80 between the first and second walls 20, 30 when the processor 144 determines that the distances D1, D2 are equal to each other (i.e., because the first notch 128 corresponds to the midpoint of the housing 102 between the first and second side surfaces 108, 110). Likewise, the second notch 130 formed in the fourth side surface 114 also corresponds to the first midpoint 80 (i.e., because the second notch 130 also corresponds to the midpoint of the housing 102 between the first and second side surfaces 108, 110). In some other embodiments, the second notch 130 may be omitted. The first and second notches 128, 130 can be used as a guide for marking the first midpoint 80 on the third wall 60. In some other embodiments, a projected point and/or line of visible light may also correspond to the first midpoint 80, and the projected light may be used as a guide for marking the first midpoint 80 on the third wall 60. In some embodiments, a light may project from one or more of the third or fourth side surfaces 112, 114 onto the third wall 60. In some other embodiments, a light may project from the bottom surface 106 of the housing 102 onto the third wall 60 when the bottom surface 106 is spaced from the third wall 60.

As illustrated in FIG. 2A, the laser distance measurer 100 is longitudinally oriented along the x-axis such that the display 118 is toward the first wall 20 and the input keys 116 are toward the second wall 30. However, the laser distance measurer 100 may function universally in any direction. For example, the orientation of the laser distance measurer 100 can be reversed such that the display 118 is toward the second wall 30. It will be appreciated that the laser distance measurer 100 can also be used along any one of the floor 40, the ceiling 50, or the fourth wall 70 in order to determine respective midpoints between the first and second walls 20, 30.

FIG. 2B is a perspective view of a laser distance measurer 100 in a building enclosure 10 illustrating floor to ceiling measurement, in accordance with some embodiments. Referring to FIG. 2B, the laser distance measurer 100 can be used to determine a distance D3 between the first side surface 108 and the ceiling 50 and a distance D4 between the second side surface 110 and the floor 40. The floor to ceiling measurement can be used to determine a second midpoint 90 (i.e., along a horizontal center line) of the third wall 60 where the second midpoint 90 of the third wall 60 is halfway between the floor 40 and the ceiling 50. The bottom surface 106 of the laser distance measurer 100 may contact the third wall 60. Alternatively, the laser distance measurer 100 may be operated without contacting the third wall 60 as described herein.

In some embodiments, the laser distance measurer 100 emits a first laser beam 120b from the first side surface 108 in a +z direction and a second laser beam 124b from the second side surface 110 in a −z direction. When the first and second laser beams 120b, 124b impact the ceiling 50 and floor 40, respectively, laser light is reflected toward the laser distance measurer 100 and received by the first and second sensors 122, 126, respectively.

As illustrated in FIG. 2B, the first notch 128 formed in the third side surface 112 corresponds to the second midpoint 90 between the floor 40 and ceiling 50 when the processor 144 determines that the distances D3, D4 are equal to each other. Likewise, the second notch 130 formed in the fourth side surface 114 also corresponds to the second midpoint 90. In some other embodiments, the second notch 130 may be omitted. The first and second notches 128, 130 can be used as a guide for marking the second midpoint 90 on the third wall 60. It will be appreciated that the laser distance measurer 100 can also be used along any one of the first wall 20, the second wall 30, or the fourth wall 70 in order to determine respective midpoints between the floor 40 and ceiling 50.

Figure 2C:
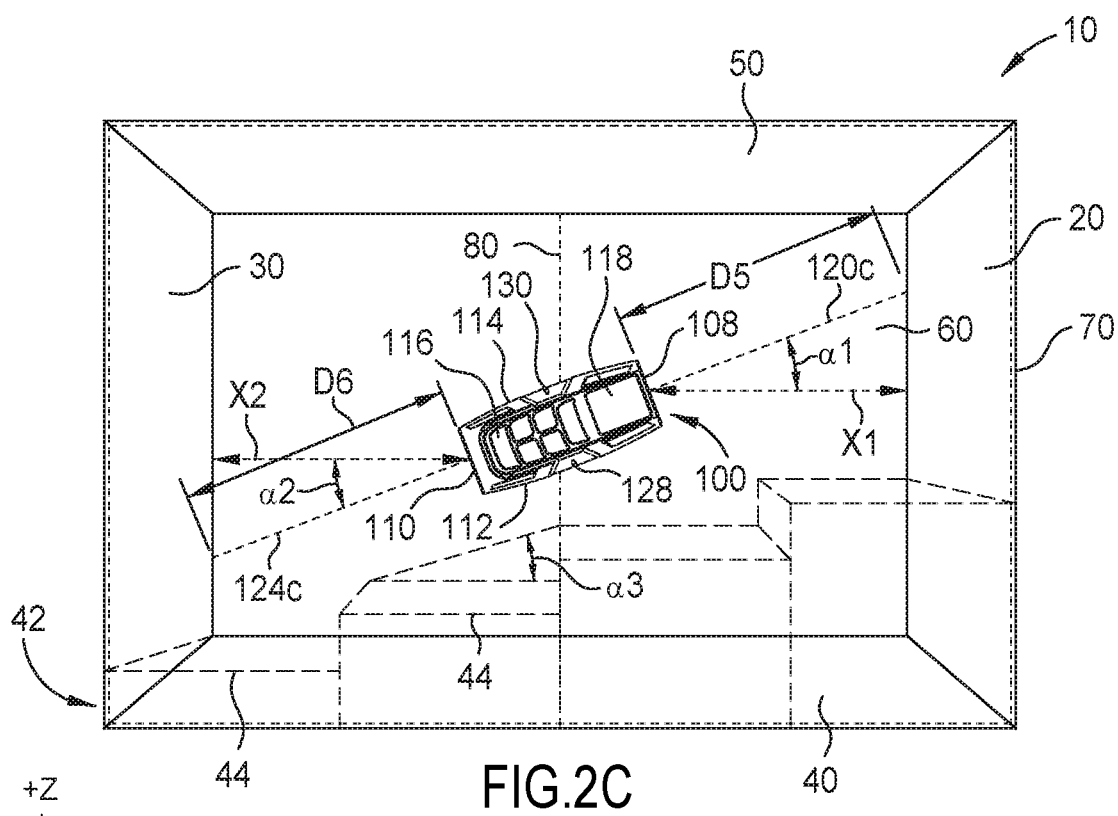
FIG. 2C is a perspective view of a laser distance measurer in a building enclosure illustrating off-axis measurement, in accordance with some embodiments.

FIG. 2C is a perspective view of a laser distance measurer 100 in a building enclosure 10 illustrating off-axis measurement, in accordance with some embodiments. Referring to FIG. 2C, the laser distance measurer 100 can be used to determine a distance D5 between the first side surface 108 and the first wall 20 and a distance D6 between the second side surface 110 and the second wall 30.

In some embodiments, the laser distance measurer 100 emits a first laser beam 120c from the first side surface 108 in a +x, +z direction and a second laser beam 124c from the second side surface 110 in a −x, −z direction. When the first and second laser beams 120c, 124c impact the first and second walls 20, 30, respectively, laser light is reflected toward the laser distance measurer 100 and received by the first and second sensors 122, 126, respectively.

As illustrated in FIG. 2C, an angle $\alpha1$ between the first laser beam 120c and the x-axis is equal to an angle $\alpha2$ between the second laser beam 124c and the x-axis. In some embodiments, the angles $\alpha1$, $\alpha2$ may be calculated using the spatial orientation device 146 with gravity (−z direction) as a reference. Thus, when the distances D5, D6 are equal to each other, a distance x1 in the +x direction from the first side surface 108 to the first wall 20 is equal to a distance x2 in the −x direction from the second side surface 110 to the second wall 30 (i.e., because the distance $x1=D5*\cos(\alpha1)$ and the distance $x2=D6*\cos(\alpha2)$). Thus, the off-axis measurement technique can be used to determine the first midpoint 80 of the third wall 60 when the first and second walls 20, 30 are parallel to each other. In addition to determining the first midpoint 80, the processor 144 can calculate the distances x1, x2 along the x-axis. The distances x1, x2 and/or the distances D5, D6 may be a screen content output to the display 118 for viewing during operation.

It will be appreciated that the off-axis angle ($\alpha1$, $\alpha2$) of the laser distance measurer 100 is limited to a range of angles where the first and second laser beams 120c, 124c directly impact the first and second walls 20, 30, respectively. In other words, the laser distance measurer 100 cannot be tilted off-axis so much that either one of the first or second laser beams 120c, 124c directly impacts the floor 40 or ceiling 50.

As illustrated in FIG. 2C, the first and second notches 128, 130 may be offset from the first midpoint 80 when the laser distance measurer 100 is used off-axis. However, depending on the level of accuracy needed in any specific application, the first and second notches 128, 130 can still be used as a guide for marking the first midpoint 80 on the third wall 60. It will be appreciated that the laser distance measurer 100 can also be used off-axis along any one of the floor 40, the ceiling 50, or the fourth wall 70 in order to determine respective midpoints between the first and second walls 20, 30. It will be appreciated that the laser distance measurer 100 can also be used off-axis for measuring the second midpoint 90 between the floor 40 and ceiling 50.

FIG. 2C also illustrates off-axis measurement along a stairwell 42 (shown in phantom) in accordance with some embodiments. The off-axis measurement technique can be used to determine the first midpoint 80 of the third wall 60 when the first and second walls 20, 30 are parallel to each other. It will be appreciated that the off-axis angle ($\alpha 1$, $\alpha 2$) of the laser distance measurer 100 is limited to a range of angles where the first and second laser beams 120c, 124c directly impact the first and second walls 20, 30, respectively. In other words, the laser distance measurer 100 cannot be tilted off-axis so much that either one of the first or second laser beams 120c, 124c directly impacts the stairwell 42 or ceiling 50.

It will be appreciated that the laser distance measurer 100 can also be used off-axis along the fourth wall 70 or on- or off-axis along the ceiling 50 in order to determine respective midpoints between the first and second walls 20, 30 along the stairwell 42. It will be appreciated that the laser distance measurer 100 can also be used for measuring the second midpoint 90 between the stairwell 42 and ceiling 50.

In some embodiments, it may be desirable to determine the skew of the laser distance measurer 100 relative to one or more of the x-axis, y-axis, or z-axis. For example, using the spatial orientation device 146, the laser distance measurer 100 can determine whether the spatial orientation state is horizontal (FIG. 2A), vertical (FIG. 2B), or between horizontal and vertical (FIG. 2C). In some embodiments, the laser distance measurer 100 may make and/or record measurements in any spatial orientation state. In some embodiments, the laser distance measurer 100 may report the skew value in addition to other screen content. In some other embodiments, the laser distance measurer 100 may only make and/or record measurements when the laser distance measurer 100 is in one of the horizontal or vertical states. In some embodiments, being in one of the horizontal or vertical states can be defined as being within a tolerance of about ±1 degrees or less. In some embodiments, the tolerance may be about ±0.1 degrees or less from horizontal or vertical.

In some embodiments, a reference angle may be input to the laser distance measurer 100 before implementing the off-axis measuring technique. In some embodiments, the skew of the laser distance measurer 100 may be used as the reference angle. In some other embodiments, the laser distance measurer 100 may be used to determine approximate rise and run of the stairwell 42 (i.e., an angle $\alpha 3$ of the stairwell 42 in the +x, +z direction) by positioning the laser distance measurer 100 such that the first and second laser beams 120c, 124c approximately align with a tip of each step 44. In some embodiments, the angle $\alpha 3$ may be a screen content output to the display 118 for viewing during operation. In some embodiments, the angle $\alpha 3$ may be input to the laser distance measurer 100 as a reference angle $\alpha s$ described herein.

Figure 2D:
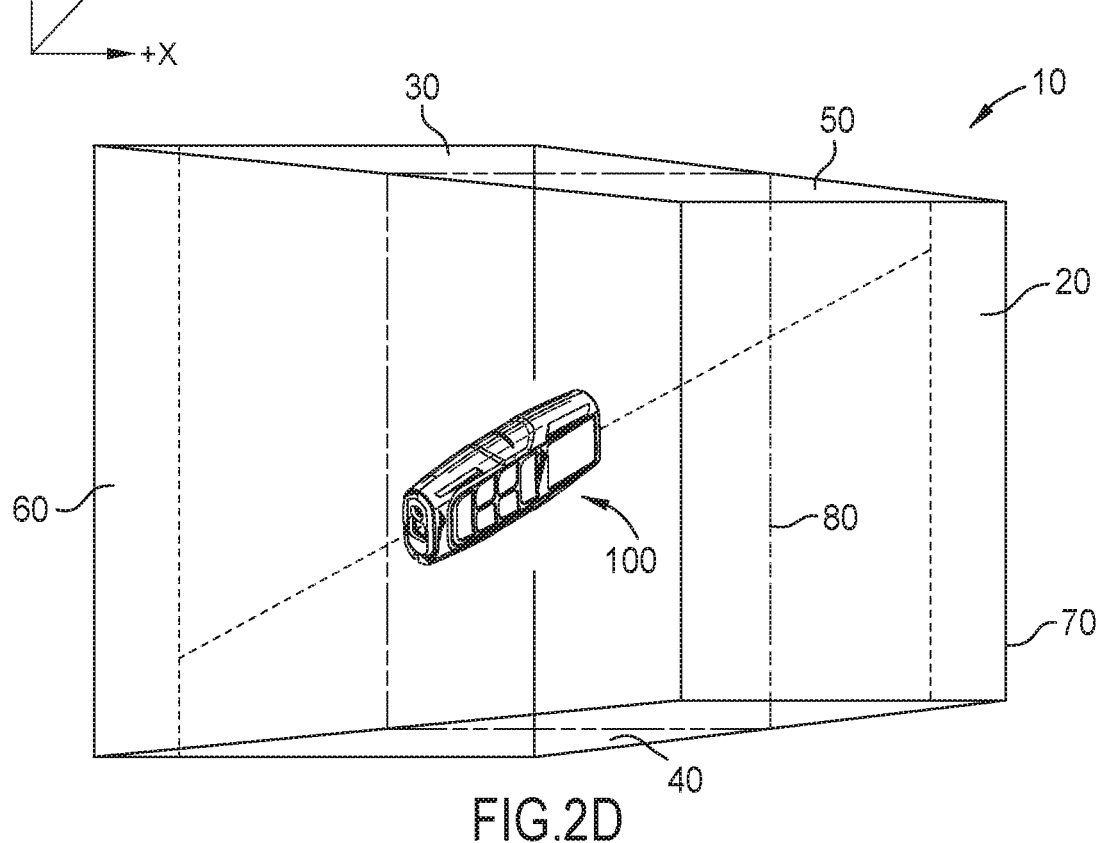
FIG. 2D is a perspective view of a laser distance measurer in a building enclosure illustrating midpoint measurement, in accordance with some embodiments.

FIG. 2D is a perspective view of a laser distance measurer 100 in a building enclosure 10 illustrating midpoint measurement, in accordance with some embodiments. Referring to FIG. 2D, the laser distance measurer 100 is spaced from each of the first, second, third, and fourth walls 20, 30, 60, 70, the floor 40, and the ceiling 50. In addition, the laser distance measurer 100 is off-axis from both the x-axis (like FIG. 2C) and the y-axis. In this position, the laser distance measurer 100 can locate the first midpoint 80 (i.e., along a vertical center y-z plane) between the first and second walls 20, 30 when the first and second walls 20, 30 are parallel. It will be appreciated that the laser distance measurer 100 can also locate the second midpoint 90 between the floor 40 and ceiling 50 while being spaced from each of the surfaces of the building enclosure 10 and while being off-axis from both the y-axis and the z-axis. It will be appreciated that the laser distance measurer 100 can also be used to determine a midpoint between the third and fourth walls 60, 70 or between any other opposing points or surfaces of the building enclosure 10, which may or may not be illustrated herein.

Figure 3:
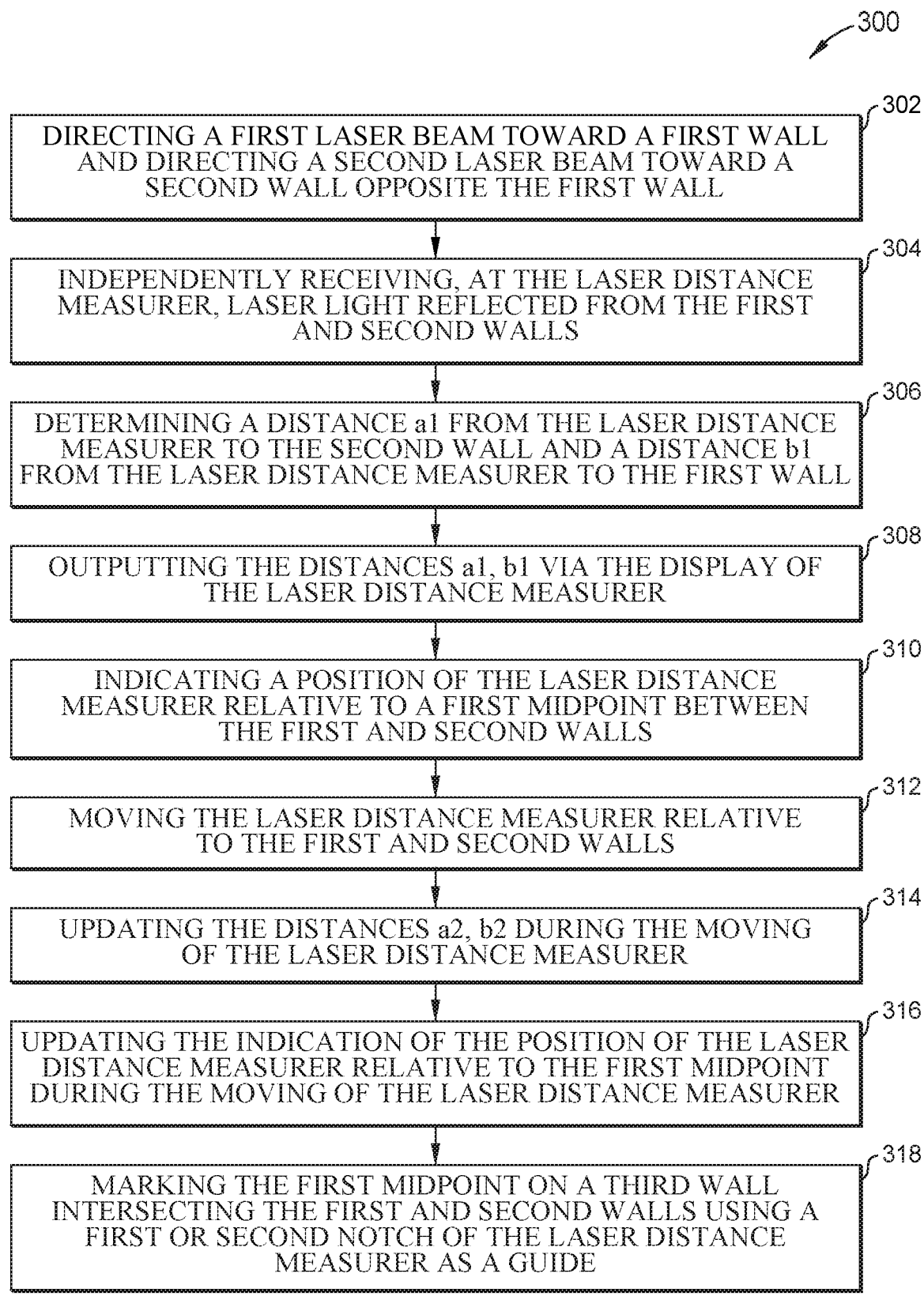
FIG. 3 is a flow chart illustrating a method for locating a midpoint using a laser distance measurer, in accordance with some embodiments.

FIG. 3 is a flow chart illustrating a method 300 for locating a midpoint (e.g., one of the first or second midpoints 80, 90) using a laser distance measurer 100, in accordance with some embodiments. FIG. 4A is a perspective view of a laser distance measurer 100 in a building enclosure 10 illustrating a starting position for implementing the method 300 of FIG. 3. FIG. 4B is an enlarged view of the laser distance measurer 100 of FIG. 4A illustrating an exemplary screen content displayed by the laser distance measurer 100.

Referring to FIGS. 3 and 4A, at step 302, the method 300 includes directing the first laser beam 120a toward the first wall 20 and directing the second laser beam 124a toward the second wall 30 opposite the first wall 20. The first and second laser beams 120a, 124a are emitted in opposite directions from the laser distance measurer 100. The first and second laser beams 120a, 124a can be emitted by the first and second lasers 120, 124 as described herein.

At step 304, the method 300 includes independently receiving, at the laser distance measurer 100, laser light reflected from the first and second walls 20, 30. The laser light can be received by the first and second sensors 122, 126 as described herein.

At step 306, the method 300 includes determining the distance a1 from the laser distance measurer 100 to the second wall 30 and the distance b1 from the laser distance measurer 100 to the first wall 20. In some embodiments, the distances a1, b1 can be determined based on transit time or phase difference as described herein. As illustrated in FIG. 4A, the laser distance measurer 100 has a starting position between the first midpoint 80 and the first wall 20 such that the distance a1 is greater than the distance b1. In some other embodiments, the laser distance measurer 100 may have a starting position between the first midpoint 80 and the second wall 30 such that the distance a1 is less than the distance b1. In yet another embodiment, the laser distance measurer 100 may have a starting position at the first midpoint 80 such that the distances a1, b1 are equal.

Referring to FIG. 4B, at step 308, the method 300 optionally includes outputting the distances a1, b1 via the display 118 of the laser distance measurer 100. The distances a1, b1 may be displayed by sending an output from the processor 144 to the display 118 to display a screen content 132a including the distances a1, b1.

At step 310, the method 300 includes indicating a position of the laser distance measurer 100 relative to the first midpoint 80 between the first and second walls 20, 30. In some embodiments, when the laser distance measurer 100 is located between the first midpoint 80 and the first wall 20, the laser distance measurer 100 may display a visual indication 134a that the distance a1 is greater than the distance b1 and/or that the laser distance measurer 100 is located between the first midpoint 80 and the first wall 20. In some other embodiments, the laser distance measurer 100 may display current values 132a for the distances a1, b1 and may also display target values 136a for the distances a, b where the target values correspond to the distances a, b at the first midpoint 80. In some other embodiments, the laser distance measurer 100 may display a visual instruction to move the laser distance measurer 100 away from the first wall 20 and/or toward the second wall 30. In some embodiments, the visual instruction may be a simple textual instruction 138a (e.g., when the second wall 30 is oriented on the left, the textual instruction may include the text [MOVE LEFT]), a simple graphical instruction 140a (e.g., an arrow pointing toward the second wall 30), and/or a precise instruction 142a (e.g., when the first midpoint 280 is located 3 feet, 3⅜ inches to the left of the laser distance measurer 100, the textual instruction may include the text [MOVE LEFT 3' 3⅜"]).

FIG. 4C is a perspective view of a laser distance measurer 100 in a second position after moving the laser distance measurer 100 relative to the starting position of FIG. 4A. FIG. 4D is an enlarged view of the laser distance measurer 100 of FIG. 4C illustrating an updated screen content displayed by the laser distance measurer 100.

Referring to FIGS. 3 and 4C, at step 312, the method 300 includes moving the laser distance measurer 100 relative to the first and second walls 20, 30. In some embodiments, the operator may move the laser distance measurer 100 according to the indication of the position relative to the first midpoint 80 in order to advance closer to the first midpoint 80. In some embodiments, the laser distance measurer 100 may be moved continuously relative to the first and second walls 20, 30 without pausing. In some embodiments, the laser distance measurer 100 may be moved from the starting position (FIG. 4A) to the second position (FIG. 4C) relative to the first and second walls 20, 30, and the laser distance measurer 100 may be paused in the second position while the distances a2, b2 and/or the indication of the position relative the first and second walls 20, 30 is updated.

Referring to FIG. 4D, at step 314, the method 300 optionally includes updating the distances a2, b2 during the moving of the laser distance measurer 100. The distances a2, b2 may be displayed by sending an output from the processor 144 to the display 118 to display an updated screen content 132b including the distances α2, b2. In some embodiments, the laser distance measurer 100 may be set to an automatic measurement mode where the laser distance measurer 100 automatically updates the distances a2, b2. In some embodiments, the automatic measurement mode may update without receiving operator input. In some embodiments, the laser distance measurer 100 may enter automatic measurement mode by receiving an input corresponding to the operator pressing and/or holding a button 116. In some embodiments, the distances a2, b2 may update continuously, such as about 1× per second or more, such as about 2× per second or more, such as about 3× per second or more, such as about every 4× per second or more, such as 5× per second or more, such as 10× per second or more. In some embodiments, the distances a2, b2 may update on the display 118 in real-time.

At step 316, the method 300 includes updating the indication of the position of the laser distance measurer 100 relative to the first midpoint 80 during the moving of the laser distance measurer 100. In some embodiments, when the second position of the laser distance measurer 100 is between the first midpoint 80 and the second wall 30, the laser distance measurer 100 may display an updated visual indication 134b that the distance α2 is less than the distance b2 and/or that the laser distance measurer 100 is located between the first midpoint 80 and the second wall 30. In some other embodiments, the laser distance measurer 100 may display updated current values 132b for the distances a2, b2 and may also display target values 136b for the distances a, b where the target values correspond to the distances a, b at the first midpoint 80. In some other embodiments, the laser distance measurer 100 may display an updated visual instruction to move the laser distance measurer 100 away from the second wall 30 and/or toward the first wall 20. In some embodiments, the visual instruction may be an updated simple textual instruction 138b (e.g., when the first wall 20 is oriented on the right, the updated textual instruction may include the text [MOVE RIGHT]), an updated simple graphical instruction 140b (e.g., an arrow pointing toward the first wall 20), and/or an updated precise instruction 142b (e.g., when the first midpoint 80 is located 0 feet, 8½ inches to the right of the laser distance measurer 100, the textual instruction may include the text [MOVE RIGHT 0' 8½"]).

In some embodiments, the laser distance measurer 100 may provide an audible signal indicating the position of the laser distance measurer 100 relative to the first midpoint 80 during the moving of the laser distance measurer 100. In some embodiments, the audible signal may include sounds having one or more different tones or frequencies. For example, when the laser distance measurer 100 is stationary, a constant frequency beeping may be emitted. In some embodiments, when the laser distance measurer 100 is moving closer to the first midpoint 80, the frequency of the beeping may increase. In some embodiments, when the laser distance measurer 100 is moving away from the first midpoint 80, the frequency of the beeping may decrease. In some embodiments, the frequency may be about 20 per second or less, such as about 10 per second or less, such as from about 1 per second to about 10 per second, such as from about 1 per second to about 5 per second. In some embodiments, when the laser distance measurer 100 is at the first midpoint 80, a constant tone may be emitted. Alternatively, when the laser distance measurer 100 is at the first midpoint 80, the frequency of beeping may have a maximum value.

In some embodiments, the laser distance measurer 100 may be set to an automatic measurement mode where the laser distance measurer 100 automatically updates the indication of the position of the laser distance measurer 100 relative to the first midpoint 80. In some embodiments, the automatic measurement mode may update without receiving operator input. In some embodiments, the laser distance measurer 100 may enter automatic measurement mode by receiving an input corresponding to the operator pressing and/or holding a button 116. In some embodiments, the indication of the position of the laser distance measurer 100 relative to the first midpoint 80 may update continuously, such as about 1× per second or more, such as about 2× per second or more, such as about 3× per second or more, such as about every 4× per second or more, such as 5× per second or more, such as 10× per second or more. In some embodiments, the indication of the position of the laser distance measurer 100 relative to the first midpoint 80 may update in real-time.

FIG. 4E is a perspective view of a laser distance measurer 100 in a third position after moving the laser distance measurer 100 relative to the second position of FIG. 4C. Referring to FIG. 4E, the third position of the laser distance measurer 100 corresponds to the first midpoint 80 between the first and second walls 20, 30.

Referring to FIGS. 3 and 4E, at step 318, the method 300 includes marking the first midpoint 80 on the third wall 60 using one or more of the first or second notches 128, 130 as a guide. The first and second notches 128, 130 correspond to the first midpoint 80 when the distances a3, b3 are equal to each other. In some embodiments, the first midpoint 80 may be more accurately marked by orienting the laser distance measurer 100 such that the first and second side surfaces 108, 110 are substantially parallel to the first and second walls 20, 30 as shown.

FIG. 4F is an enlarged view of the laser distance measurer 100 of FIG. 4E illustrating an updated screen content displayed by the laser distance measurer 100. Referring to FIG. 4F, the display 118 includes exemplary updated screen content 132c, 134c, 136c, 138c, 140c, 142c corresponding to the first midpoint 80.

As illustrated in FIGS. 4B, 4D, and 4F, the screen content is oriented from top to bottom along the z-axis and from left to right along the x-axis. In other words, the screen content is oriented for viewing by an operator standing on the floor 40 and facing the third wall 60. In some embodiments, the screen content may be rotatable relative to the display 118. In some embodiments, the spatial orientation device 146 may determine the spatial orientation of the housing 102 and a signal corresponding to the determined spatial orientation may be transmitted to the processor 144. In some embodiments, the spatial orientation may correspond to one of a lengthwise or widthwise orientation of the housing 102. In some embodiments, a storage device may store computer readable instructions for instructing the processor 144 to rotate the screen content relative to the housing 102 in order to make the screen content readable by the operator.

For example, when the housing 102 is oriented substantially along the +x-axis (FIG. 2A), the screen content may be oriented top to bottom from the fourth side surface 114 to the third side surface 112 and left to right from the second side surface 110 to the first side surface 108. In some embodiments, being oriented substantially along the +x-axis can be defined as being within ±45 degrees of the +x-axis such that the housing 102 is oriented closer relative to the x-axis than to the z-axis. Alternatively, when the housing 102 is oriented substantially along the −x-axis, the screen content may be rotated 180 degrees such that the screen content is oriented top to bottom from the third side surface 112 to the fourth side surface 114 and left to right from the first side surface 108 to the second side surface 110. Alternatively, when the housing 102 is oriented substantially along the +z-axis (FIG. 2B), the screen content may be oriented top to bottom from the first side surface 108 to the second side surface 110 and left to right from the fourth side surface 114 to the third side surface 112. Alternatively, when the housing 102 is oriented substantially along the −z-axis, the screen content may be rotated 180 degrees such that the screen content is oriented top to bottom from the second side surface 110 to the first side surface 108 and left to right from the third side surface 112 to the fourth side surface 114. In some embodiments, being oriented substantially along any axis can be defined as being within ±45 degrees of that axis as described above.

In another embodiment, the laser distance measurer 100 can be used to locate the center of the third wall 60 (i.e., a point where the first and second midpoints 80, 90 overlap or where the vertical and horizontal center lines intersect). First, the laser distance measurer 100 is used to locate the first midpoint 80 between the first and second walls 20, 30 (e.g., according to the method 300). The laser distance measurer 100 can then be repositioned and used to locate the second midpoint 90 between the floor 40 and ceiling 50. The steps of locating the first and second midpoints 80, 90 can be repeated until the first and second midpoints 80, 90 overlap, at which point the first and second midpoints 80, 90 correspond to the center of the third wall 60. It will be appreciated that the center of the building enclosure 10 (e.g., along the floor 40) can be located by adapting the foregoing method by locating the first midpoint 80, then locating the midpoint between the third and fourth walls 60, 70, and then repeating the steps of locating the first midpoint 80 and the midpoint between the third and fourth walls 60, 70 until the first midpoint 80 and the midpoint between the third and fourth walls 60 overlap, at which point the first midpoint 80 and the midpoint between the third and fourth walls 60, 70 correspond to the center of the building enclosure 10. It will be appreciated that the foregoing method may be used to locate a center of any structure or other space having suitable boundary points or surfaces.

While the laser distance measurer 100 described herein is a dual laser instrument, in some embodiments it may be desirable and/or necessary to select one of the lasers 120, 124 for active use and deactivate the other one of the lasers 120, 124. In other words, the laser distance measurer 100 may be switched from being a 2-way dual laser instrument to a 1-way single laser instrument. For example, instead of measuring the first midpoint 80 between the first and second walls 20, 30, it may be desirable to measure a 1-way midpoint between a reference point and the first wall 20.

In some embodiments, a method for performing 1-way midpoint measurement may be analogous to the method 300 of FIG. 3. For example, the 1-way midpoint measurement can include positioning the laser distance measurer 100 at the reference point; directing a first laser beam toward the first wall 20; receiving, at the laser distance measurer 100, laser light reflected from the first wall 20; determining a 1-way distance from the reference point to the first wall 20; outputting the 1-way distance via the display 118; indicating a position of the laser distance measurer 100 relative to the 1-way midpoint; outputting an instruction corresponding to a proposed movement of the laser distance measurer 100 relative to the reference point to locate the 1-way midpoint; moving the laser distance measurer 100 according to the proposed movement; updating the 1-way distance from the laser distance measurer 100 to the first wall 20 during the moving; updating an indication of a position of the laser distance measurer 100 relative to the 1-way midpoint during the moving; updating an instruction corresponding to an updated proposed movement of the laser distance measurer 100 relative to a current position of the laser distance measurer 100 during the moving; repeating one or more of the foregoing steps until the laser distance measurer 100 is located at the 1-way midpoint; and/or marking the 1-way midpoint on the third wall 60 using one of the first or second notches 128, 130 as a guide. It will be appreciated that the 1-way midpoint measurement can be used to locate and/or mark a 1-way midpoint or a plurality of 1-way segments between a reference point and any opposing point or surface.

In some embodiments, it may be desirable to construct a temporary reference surface or boundary point for defining a space such that one or more laser beams may reflect off the temporary reference surface. In some embodiments, a temporary reference surface may be used for any application where one or more pre-existing opposing points or surfaces are unavailable such as for measuring an open or outdoor space, a building under construction, a portion of a larger enclosure, or any other suitable undefined space. In some embodiments, a single temporary reference structure may be used with another existing surface. In some other embodiments, two opposing temporary reference structures may be used. In some other embodiments, a temporary reference surface may be used when 1-way midpoint measurement would otherwise be necessary.

Figure 6A:
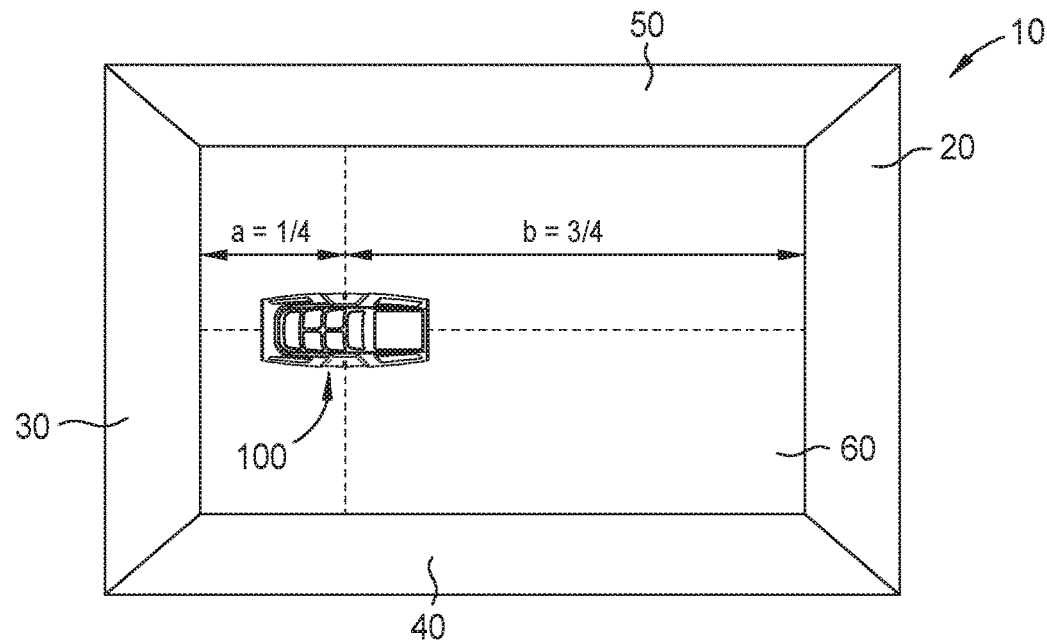
FIGS. 6A-6C are perspective views of a laser distance measurer in a building enclosure illustrating the method of FIG. 5.
Figure 6B:
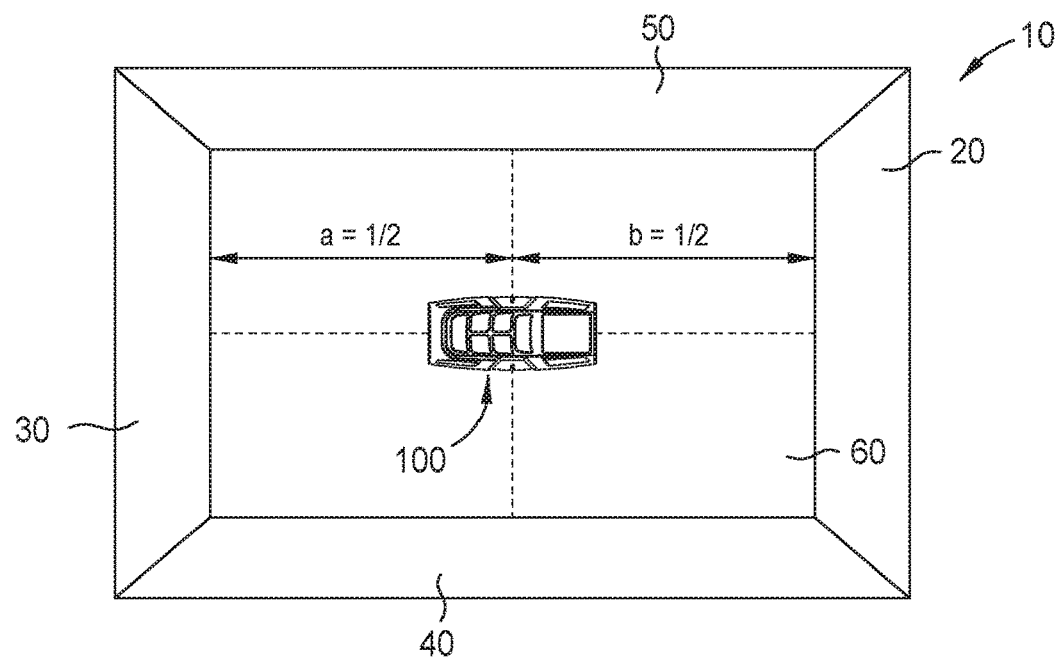
Figure 6C:
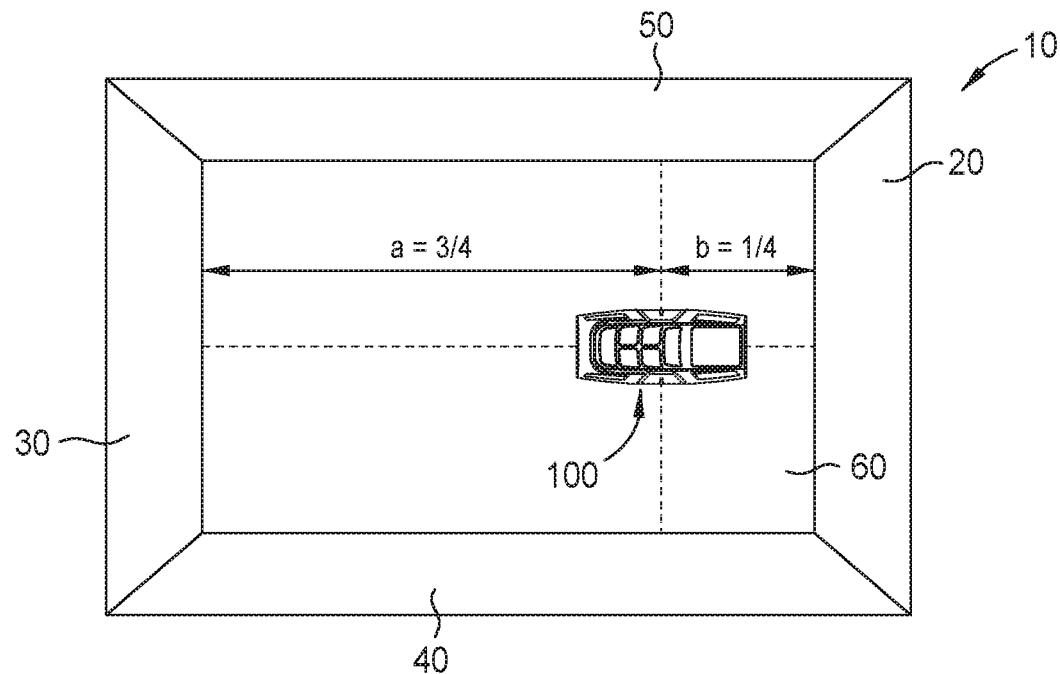

FIG. 5 is a flow chart illustrating a method 500 for performing a segmentation process using a laser distance measurer 100, in accordance with some embodiments. FIGS. 6A-6C are perspective views of a laser distance measurer 100 in a building enclosure 10 illustrating the method 500 of FIG. 5. Referring to FIG. 5, at step 502, the method 500 includes receiving a first input corresponding to selecting a segmentation process to be implemented via the laser distance measurer 100. In some embodiments, receiving the first input can be or include an operator pressing and/or holding a button 116 on the laser distance measurer 100 corresponding to selecting the segmentation process.

At step 504, the method 500 includes receiving a second input corresponding to a total number of segments $S_{TOTAL}$ for the segmentation process. In some embodiments, the segmentation process can be used to determine one or more equally spaced target positions between opposing surfaces (e.g., target positions along the third wall 260), where the target positions divide the segments. In some embodiments, each target position may be disposed on a different spaced apart parallel axis aligned in one of the x-, y-, or z-directions. In some embodiments, $S_{TOTAL}$ may be 2 equal segments or more, such as from 2 equal segments to 6 equal segments, such as 2 equal segments, alternatively 3 equal segments, alternatively 4 equal segments, alternatively 5 equal segments, alternatively 6 equal segments. It will be appreciated that a total number of target positions is equal to $S_{TOTAL}-1$. For example, when $S_{TOTAL}$ is equal to 4, the number of target positions is equal to 3. In some embodiments, receiving the second input can be or include an operator entering a value for $S_{TOTAL}$ using one or more of the input keys 116 of the laser distance measurer 100.

In some embodiments, the segments may have different length such that the target positions are non-equally spaced. For example, when $S_{TOTAL}$ is equal to 4, a length of outer segments adjacent the first and second walls 20, 30 may be greater than a length of inner segments adjacent the first midpoint 80. For example, for a third wall 60 having total length x, each of the outer segments may have length x/6, and each of the inner segments may have length x/3. It will be appreciated that any number segments having equal or non-equal length may be used in the method 500.

At step 506, the method 500 includes outputting an instruction corresponding to locating an nth target position of the laser distance measurer 100 according to the total number of segments. In some embodiments, the instruction can be or include any of the screen content 132, 134, 136, 138, 140, 142 described herein. In some other embodiments, the instruction can be or include a visual and/or audible instruction to instruct an operator to locate the nth target position. For example, for equal segment lengths when $S_{TOTAL}$ is equal to four, the nth target position may be a=¼, b=¾ as illustrated in FIG. 6A.

At step 508, the method 500 includes determining when the laser distance measurer 100 is located at the nth target position. The laser distance measurer 100 can determine position relative to the nth target position using any of the techniques described herein.

At step 510, the method 500 includes outputting an indication that the laser distance measurer 100 is located at the nth target position. In some embodiments, the indication that the laser distance measurer 100 is located at the nth target position can be or include any of the screen content 132, 134, 136, 138, 140, 142 described herein. In some other embodiments, the indication can be an audible indication, such as a beep, tone, or other suitable sound.

At step 512, the method 500 includes marking the nth target position on the third wall 60 intersecting the first and second walls 20, 30. In some embodiments, the nth target position may be marked by using one of the first or second notches 128, 130 as a guide. The first and second notches 128, 130 correspond to the nth target position when the processor 144 determines that the current position of the laser distance measurer 100 corresponds to the nth target position (e.g., when the current position corresponds to a=¼, b=¾).

At step 514, the method 500 includes receiving an input corresponding to having completed locating the nth target position. In some embodiments, the input can be or include a button 116 being pressed by the operator. After completion of step 514 and/or after the nth target position is located, the value of n is increased by one, and the method 500 returns to step 506 where the next instruction for locating the next target position is output by the processor 144. For example, the next target position may be a=½, b=½ as illustrated in FIG. 6B. After completion of locating a=½, b=½, the method 500 may again return to step 506, where the next instruction for locating the next target position is output by the processor 144. For example, the next target position may be a=½, b=¼ as illustrated in FIG. 6C. The steps 506-514 of method 500 may be repeated for n=1 to n=$S_{TOTAL}-1$ until all the target positions are located and/or marked.

Figure 7:
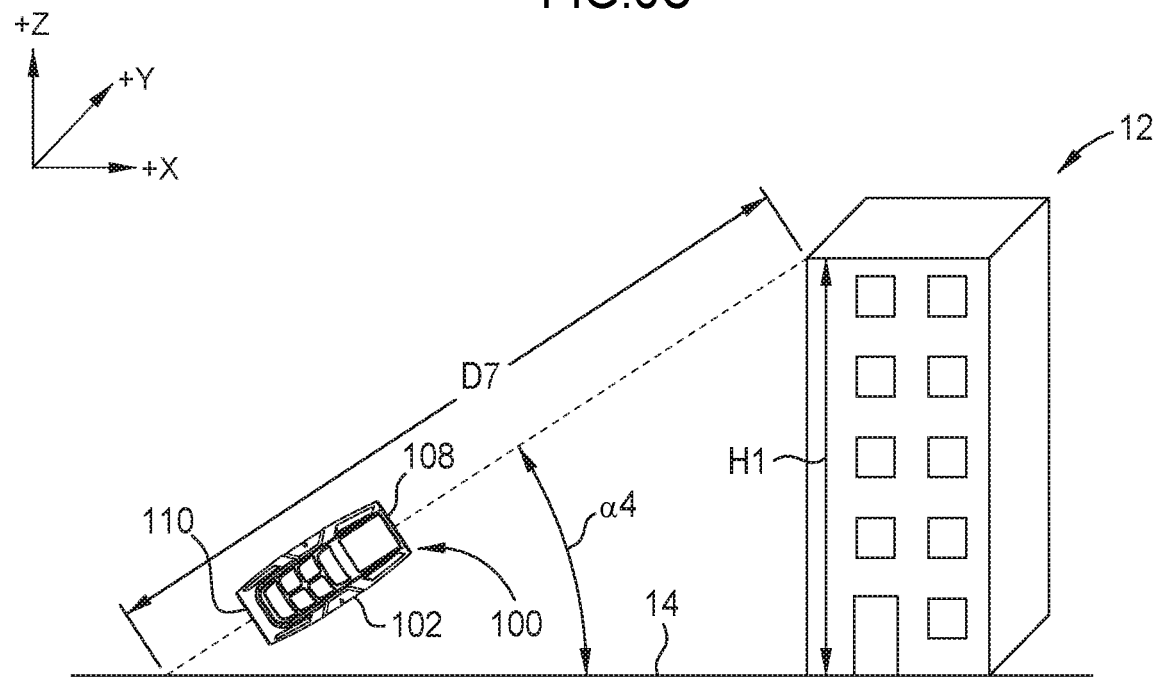
FIG. 7 is a perspective view of a laser distance measurer being utilized outside a building illustrating a height measurement technique, in accordance with some embodiments.

FIG. 7 is a perspective view of a laser distance measurer 100 being utilized outside a building 12 illustrating a height measurement technique, in accordance with some embodiments. Referring to FIG. 7, the building 12 has a height H1, where the height H1 is measured along the z-axis at a right angle relative to a ground surface 14, which is substantially aligned with the x-axis. In some embodiments, the laser distance measurer 100 can determine a distance D7 according to methods described herein. In some examples, the laser distance measurer 100 can determine a first distance from the first side surface 108 to the building 12 and a second distance from the second side surface 110 to the ground surface 14. Next, the processor 144 can sum the first and second distances and a length of the housing 102 between the first and second side surfaces 108, 110 to determine the distance D7. In some embodiments, the onboard spatial orientation device 146 can determine the angle α4 between the laser distance measurer 100 and the x-axis as illustrated. In some embodiments, the height H1 of the building 12 can be computed by the processor 144 according to the formula, H1=D7*sin(α4). In some embodiments, the laser distance measurer can output the height H1 to the operator according to methods described herein. It will be appreciated that the height H1 is determined most accurately when the ground surface 14 is substantially level between the laser distance measurer 100 and the building 12. In some embodiments, the determined height H1 can be corrected for deviation of the ground surface 14 from the z-axis between the laser distance measurer 100 and the building 12.

Figure 8B:
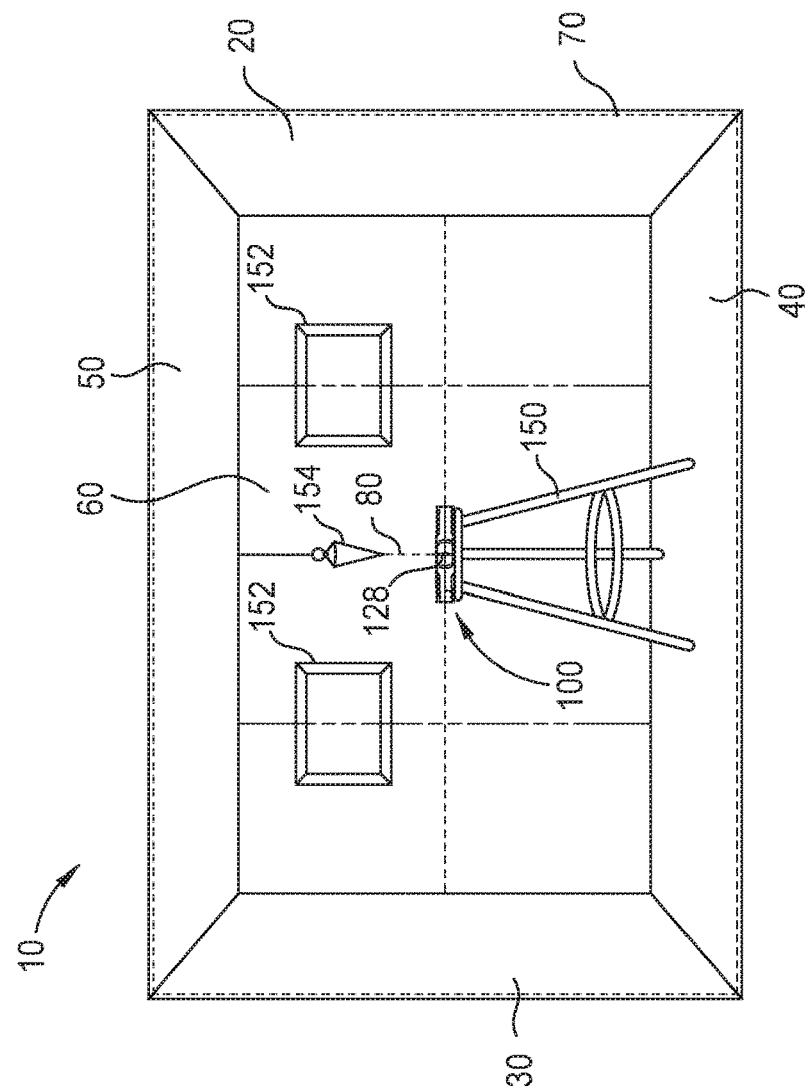
FIG. 8B is a perspective view of a laser distance measurer in a building enclosure illustrating hands-free operation, in accordance with some embodiments.
Figure 8A:
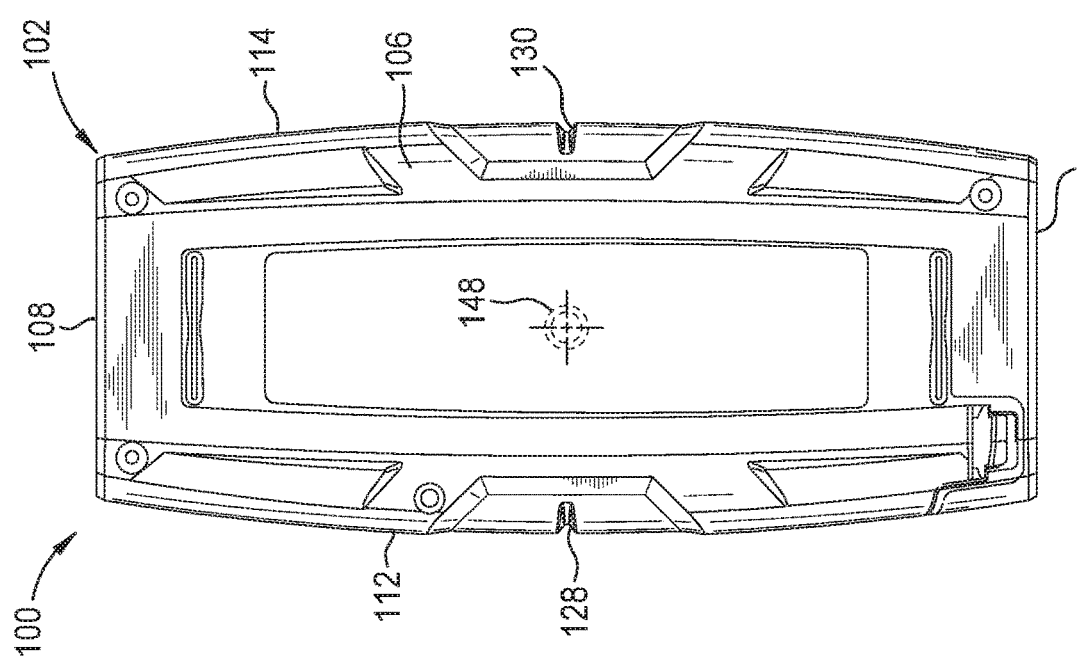
FIG. 8A is a bottom view of a laser distance measurer, in accordance with some embodiments.

FIG. 8A is a bottom view of a laser distance measurer 100, in accordance with some embodiments. Referring to FIG. 8A, the bottom surface 106 includes a hole 148 or another type of recess. In some embodiments, the hole 148 may be threaded. In some embodiments, the hole 148 has a diameter of about ¼ inch. Alternatively, the diameter may be from about ⅛ inch to about ⅜ inch. In some embodiments, the hole 148 may be centered on the bottom surface 106. In some embodiments, the hole 148 may be configured for attaching the laser distance measurer 100 to a tripod or another type of stand.

FIG. 8B is a perspective view of a laser distance measurer 100 in a building enclosure 10 illustrating hands-free operation, in accordance with some embodiments. Referring to FIG. 8B, the laser distance measurer 100 is attached to a tripod 150 via the hole 148. Alternatively, the laser distance measurer 100 may be attached to the tripod 150 by another type of fastener. It will be appreciated that the tripod 150 can pivot by 360 degrees to position the laser distance measurer 100 in any direction and orientation and that the tripod 150 can be raised or lowered to position the laser distance measurer 100 at a range of heights relative to the floor 40.

In operation, the first midpoint 280 may be located similar to other embodiments described herein. In some other embodiments, hands-free operation may also be used for locating a second midpoint between the floor 40 and ceiling 50, for performing a segmentation process, or for performing any other process described herein.

As illustrated, the hands-free operation may include locating the first midpoint 80, where the laser distance measurer 100 is held by the tripod 150 at the first midpoint 280. Optionally, one of the first and second notches 128, 130 can be used as a guide for marking the first midpoint 80 on the third wall 60. In some other embodiments, a projected point and/or line of visible light may also correspond to the first midpoint 80, and the projected light may be used as a guide for marking the first midpoint 80 on the third wall 60.

Alternatively, while the laser distance measurer 100 is held by the tripod 150, the operator may hang one or more pictures 152 on the third wall 60 and/or drop a plumb bob 154 from the ceiling 50. It will be appreciated that the locations of the one or more pictures 152 and the plumb bob 154 are exemplary, and the locations are not particularly limited to the illustrated embodiment.

In some embodiments, the laser distance measurer 100 can be used to locate and/or mark a midpoint or a plurality of segments between any two opposing points or surfaces. In some embodiments, the surfaces can be or include any interior or exterior building surfaces, including without limitation walls, floors, ceilings, stairs, roofs, facades, chimneys, sills, soffits, copings, claddings, framing, molding, lapping, foundations, piling, siding, cornices, pediments, steps, columns, windows, doors, and canopies. In some embodiments, the interior or exterior building surfaces can be or include finished structures and/or spaces. In some other embodiments, the interior or exterior building surfaces can be or include structures and/or spaces currently under construction and/or renovation.

In some embodiments, the surfaces can be formed of or include any suitable materials, including without limitation gypsum (e.g., drywall, plasterboard, wallboard, sheet rock, gypsum board), wood, masonry (e.g., brick, stone, adobe, terra-cotta, ceramics, stucco, concrete, mortar), metal (e.g., cast iron, steel, aluminum, lead, bronze, brass, copper), fabrics, foam, and plastics. In some other embodiments, the laser distance measurer 100 can be used on non-building surfaces, including without limitation, roads, sidewalks, parking lots, garages, bridges, tunnels, curbs, barriers, poles, construction equipment, industrial equipment, landscaping structures, trees, plants, and other natural elements.

In at least one embodiment, the laser distance measurer 100 can be used for painting parking stripes. For example, the laser distance measurer 100 may be disposed on a pavement surface of a surface lot or an underground, above ground, and/or tiered parking structure. In addition, one or more temporary or permanent reference surfaces may serve as boundary surfaces for a series of segments corresponding to a row of parking spaces. A segmentation process may then be utilized to mark each target position corresponding to a plurality of parking stripes on the pavement (e.g., by using the method 500 of FIG. 5).

In some embodiments, instead of using laser light, the laser distance measurer 100 may emit first and second focused sound waves (e.g., ultrasound waves) and detect respective reflected sound waves in order to determine respective distances. In such embodiments, operation of the laser distance measurer 100 may be otherwise unchanged.

While the foregoing is directed to embodiments of the present disclosure, other and further embodiments of the disclosure may be devised without departing from the basic scope thereof, and the scope thereof is determined by the claims that follow.

What is claimed is:

1. A laser distance measurer for locating a midpoint between a first surface and a second surface opposite the first surface, the laser distance measurer comprising:
   a housing having a top surface, a bottom surface, and first and second side surfaces intersecting the top and bottom surfaces;
   a first laser disposed along the first side surface for emitting a first laser beam in a first direction;
   a first sensor disposed along the first side surface for receiving laser light reflected from the first surface;
   a second laser disposed along the second side surface for emitting a second laser beam in a second direction opposite the first direction;
   a second sensor disposed along the second side surface for receiving laser light reflected from the second surface; and
   a processor disposed in the housing, the processor being configured to:
      determine a first distance from the laser distance measurer to the first surface and a second distance from the laser distance measurer to the second surface; and
      indicate a position of the laser distance measurer relative to the midpoint between the first and second surfaces based on the first and second distances.

2. The laser distance measurer of claim 1, further comprising a first notch formed in a third side surface, wherein the first notch corresponds to the midpoint when the processor determines that the first and second distances are equal to each other.

3. The laser distance measurer of claim 2, wherein:
   the bottom surface of the housing is shaped and configured to contact a wall intersecting the first and second surfaces, and
   the first notch corresponds to the midpoint along the wall when the bottom surface of the housing contacts the wall intersecting the first and second surfaces and the processor determines that the first and second distances are equal to each other.

4. The laser distance measurer of claim 2, further comprising a second notch formed in a fourth side surface opposite the third side surface, wherein the second notch is aligned with the first notch, and wherein the second notch corresponds to the midpoint between the first and second surfaces when the processor determines that the first and second distances are equal to each other.

5. The laser distance measurer of claim 1, wherein the processor is further configured to determine updated first and second distances continuously during moving of the laser distance measurer.

6. The laser distance measurer of claim 5, wherein the processor determines updated first and second distances at least one time per second.

7. The laser distance measurer of claim 1, further comprising a spatial orientation device for determining a spatial orientation of the laser distance measurer.

8. The laser distance measurer of claim 7, wherein the spatial orientation device is a gyroscope.

9. The laser distance measurer of claim 1, wherein the processor is further configured to update the indication of the position of the laser distance measurer relative to the midpoint during moving of the laser distance measurer.

10. The laser distance measurer of claim 1, further comprising a display disposed on the top surface, wherein the processor controls the display to display a screen content indicating the position of the laser distance measurer relative to the midpoint.

11. The laser distance measurer of claim 1, further comprising:
a spatial orientation device disposed in the housing, the spatial orientation device being configured to provide a signal to the processor indicating an orientation of the housing relative to a reference angle, wherein:
the reference angle is, by default, one of zero degrees or ninety degrees relative to horizontal, and
the reference angle can be changed by user input.

12. The laser distance measurer of claim 1, further comprising a speaker disposed in the housing, the speaker being controlled by the processor to audibly indicate the position of the laser distance measurer relative to the midpoint.

13. The laser distance measurer of claim 1, wherein the processor is configured to determine the first distance based on, at least in part, a first transit time of the first laser beam between the first laser and the first surface and the reflected laser light between the first surface and the first sensor, and wherein the processor is configured to determine the second distance based on, at least in part, a second transit time of the second laser beam between the second laser and the second surface and the reflected laser light between the second surface and the second sensor.

14. The laser distance measurer of claim 1, wherein the processor is configured to determine the first distance based on, at least in part, a first phase difference between the first laser beam emitted by the first laser and the reflected laser light received by the first sensor, and wherein the processor is configured to determine the second distance based on, at least in part, a second phase difference between the second laser beam emitted by the second laser and the reflected laser light received by the second sensor.

15. The laser distance measurer of claim 1, further comprising a visible light source disposed in the housing, wherein a light projected by the visible light source corresponds to the midpoint when the processor determines that the first and second distances are equal to each other.

16. The laser distance measurer of claim 1, further comprising a hole formed in the bottom surface for attaching the laser distance measurer to a stand for hands-free operation.

17. A method for locating a midpoint between a first surface and a second surface, comprising:
directing a first laser beam toward the first surface and a second laser beam toward the second surface, wherein the first and second laser beams are emitted in opposite directions from a laser distance measurer;
independently receiving, at the laser distance measurer, laser light reflected from the first and second surfaces;
determining a first distance from the laser distance measurer to the first surface and a second distance from the laser distance measurer to the second surface; and
indicating a position of the laser distance measurer relative to the midpoint between the first and second surfaces based on the first and second distances.

18. The method of claim 17, wherein the position of the laser distance measurer relative to the midpoint is indicated on a display.

19. The method of claim 18, further comprising:
moving the laser distance measurer relative to the first and second surfaces; and
updating the indication of the position of the laser distance measurer relative to the midpoint during the moving of the laser distance measurer.

20. The method of claim 17, wherein the position of the laser distance measurer relative to the midpoint is indicated with an audible signal from a speaker.

21. The method of claim 17, wherein indicating the position of the laser distance measurer relative to the midpoint comprises generating, with the speaker, a first audible signal when the laser distance measurer is located at the midpoint.

22. The method of claim 21, wherein indicating the position of the laser distance measurer relative to the midpoint comprises generating, with the speaker, a second audible signal different from the first audible signal when the first and second distances are different from each other.

23. The method of claim 17, wherein the laser distance measurer includes a notch corresponding to the midpoint when the first and second distances are the same, the method further comprising marking the midpoint on the wall using the notch as a guide.

24. A method for performing a segmentation process, comprising:
determining one or more target positions between a first surface and a second surface;
directing a first laser beam toward the first surface and a second laser beam toward the second surface, wherein the first and second laser beams are emitted in opposite directions from a laser distance measurer;
independently receiving, at the laser distance measurer, laser light reflected from the first and second surfaces;
determining a first distance from the laser distance measurer to the first surface and a second distance from the laser distance measurer to the second surface; and
indicating a position of the laser distance measurer relative to a first target position between the first surface and the second surface based on the first and second distances, the first target position being between a first segment out of a plurality of continuous equal segments and a second segment out of the plurality of continuous equal segments, the second segment being adjacent to the first segment, and the plurality of continuous equal segments being the sum of the first distance and the second distance.

25. The method of claim 24, further comprising receiving a first input corresponding to a total desired number of the continuous equal segments for the segmentation process.

26. The method of claim 24, further comprising receiving a second input corresponding to having completed locating the first target position.

27. The method of claim 26, further comprising, after receiving the second input, indicating the position of the laser distance measurer relative to a second target position, the second target position being between the second segment and a third segment out of the plurality of continuous equal segments, the third segment being adjacent to the second segment.

\* \* \* \* \*